United States Patent
Latheef et al.

(10) Patent No.: US 12,028,940 B2
(45) Date of Patent: Jul. 2, 2024

(54) METHOD AND APPARATUS FOR PERFORMING COMMUNICATION IN WIRELESS COMMUNICATION SYSTEM

(71) Applicant: Samsung Electronics Co., Ltd., Suwon-si (KR)

(72) Inventors: Fasil Abdul Latheef, Bangalore (IN); Neha Sharma, Bangalore (IN); Pravjyot Singh Deogun, Bangalore (IN); Aneesh Deshmukh, Bangalore (IN); Shouvik Guha, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/053,745

(22) PCT Filed: May 10, 2019

(86) PCT No.: PCT/KR2019/005672
§ 371 (c)(1),
(2) Date: Nov. 6, 2020

(87) PCT Pub. No.: WO2019/216717
PCT Pub. Date: Nov. 14, 2019

(65) Prior Publication Data
US 2021/0259051 A1    Aug. 19, 2021

(30) Foreign Application Priority Data

| May 10, 2018 | (IN) | 201841017695 |
| May 10, 2018 | (IN) | 201841017696 |
| May 9, 2019 | (IN) | 201841017695 |

(51) Int. Cl.
*H04W 76/12* (2018.01)
*H04W 24/02* (2009.01)
(Continued)

(52) U.S. Cl.
CPC ........ *H04W 88/085* (2013.01); *H04W 24/02* (2013.01); *H04W 40/22* (2013.01); *H04W 76/12* (2018.02); *H04W 92/20* (2013.01)

(58) Field of Classification Search
CPC ... H04W 88/085; H04W 24/02; H04W 40/22; H04W 76/12; H04W 92/20; H04W 76/10
See application file for complete search history.

(56) References Cited

U.S. PATENT DOCUMENTS 10,136,359 B2    11/2018 Hampel et al.
2011/0314289 A1 *  12/2011 Horn ............ H04L 9/0816
                                                           713/175
(Continued)

FOREIGN PATENT DOCUMENTS

| CA | 3095500 A1 * | 10/2019 | ............ H04W 16/28 |
| CN | 103098504 A | 5/2013 | |

(Continued)

OTHER PUBLICATIONS

Qualcomm (Way forward—IAB Architecture for L2/L3 relaying, R3-181944, Apr. 2018).*

(Continued)

*Primary Examiner* — Lakeram Jangbahadur

(57) ABSTRACT

Provided are methods and apparatuses for performing a communication in a wireless communication system. An IAB node of performing a communication, according to an embodiment, includes a transceiver and a processor coupled with the transceiver and configured to perform an authentication and a setup of an IP connectivity with an OAM (operations, administration and maintenance) server, in response to an architecture in which a DU (distribution unit) and a CU (central unit) are split, establish a F1 interface (Continued)

between a DU of the IAB node and a CU of an IAB donor, and provide a service to a UE based on a result of the establishment.

15 Claims, 16 Drawing Sheets

(51) Int. Cl.
*H04W 40/22* (2009.01)
*H04W 88/08* (2009.01)
*H04W 92/20* (2009.01)

(56) References Cited

U.S. PATENT DOCUMENTS

| | | | | |
|---|---|---|---|---|
| 2017/0006499 | A1* | 1/2017 | Hampel | H04W 28/10 |
| 2019/0380159 | A1* | 12/2019 | Bangolae | H04W 76/14 |
| 2020/0084618 | A1* | 3/2020 | Teyeb | H04W 80/02 |
| 2020/0084688 | A1* | 3/2020 | Mildh | H04W 40/24 |
| 2021/0076368 | A1* | 3/2021 | Malkamäki | H04W 76/12 |
| 2021/0127430 | A1* | 4/2021 | Teyeb | H04W 76/10 |

FOREIGN PATENT DOCUMENTS

| | | | | |
|---|---|---|---|---|
| JP | 2021521736 A | * | 5/2018 | ............ H04W 24/02 |
| KR | 10-2018-0022699 A | | 3/2018 | |
| WO | 2012034599 A1 | | 3/2012 | |
| WO | 2017004253 A1 | | 1/2017 | |

OTHER PUBLICATIONS

Ericsson (Setup procedures for IAB-node and a UE connected to an IAB node, R3-181313, Mar. 2018).*
Intel (On RAN architecture for IAB relaying in NR, R3-181351, Feb. 2018).*
Intel (On RAN architecture for IAB relaying in NR (R3-181351, Mar. 2018).*
Ericsson, "Functional split between IAB node and other network nodes", 3GPP TSG-RAN WG3 #99, Feb. 26-Mar. 2, 2018, R3-181311, 6 pages.
Intel Corporation, "On RAN architecture for IAB relaying in NR", 3GPP TSG-RAN3 Meeting #99, Feb. 26-Mar. 2, 2018, R3-181351, 6 pages.
Ericsson, "Setup procedures for IAB-node and a UE connected to an IAB node", 3GPP TSG-RAN WG3 #99, Feb. 26-Mar. 2, 2018, R3-181313, 7 pages.
Notification of Transmittal of the International Search Report and the Written Opinion of the International Searching Authority, or Declaration dated Aug. 13, 2019 in connection with International Patent Application No. PCT/KR2019/005672, 9 pages.
Supplementary European Search Report dated Dec. 10, 2020 in connection with European Application No. 19800198.4, 11 pages.
AT&T, "On Backhauling of F1-U and F1-C for IAB with L2 relaying," R3-182297, 3GPP TSG-RAN WG3 #99bis, Sanya, China, Apr. 16-20, 2018, 7 pages.
LG Electronics Inc, "F1 message transport between IAB Donor and IAB Node," R3-182083, 3GPP TSG-RAN WG3 #99bis, Sanya, China, Apr. 16-20, 2018, 3 pages.
Qualcomm Inc, et al, "Way Forward—IAB Architecture for L2/3 relaying," R3-181944, 3GPP TSG-RAN WG3 Meeting #99bis, Sanya, China, Apr. 16-20, 2018, 6 pages.
ZTE, "Discussion on IAB architectures," R3-181829, 3GPP TSG-RAN WG3 #99bis, Sanya, China, Apr. 16-20, 2018, 9 pages.
Korean Intellectual Property Office, "Notice of Non-Final Rejection," dated Mar. 29, 2022, in connection with Korean Patent Application No. 10-2020-7034364, 12 pages.
European Patent Office, "Communication under Rule 71(3) EPC," dated Jan. 20, 2023, in connection with European Patent Application No. 19800198.4, 72 pages.
European Patent Office, "Communication under Rule 71(3) EPC," dated May 26, 2023, in connection with European Patent Application No. 19800198.4, 72 pages.
China National Intellectual Property Administration, "The First Office Action," dated Jul. 7, 2023, in connection with China Patent Application No. 201980028862.6, 20 pages.

* cited by examiner

[Fig. 1a]
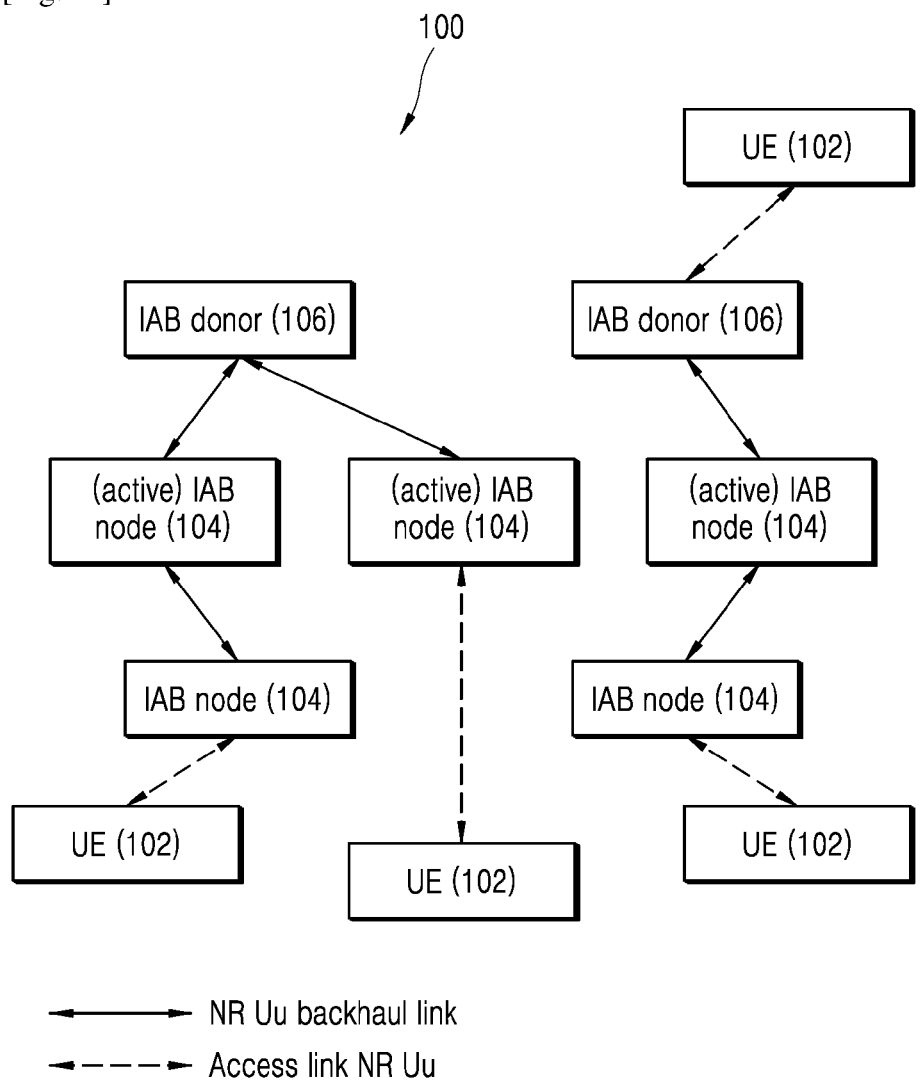

[Fig. 1b]
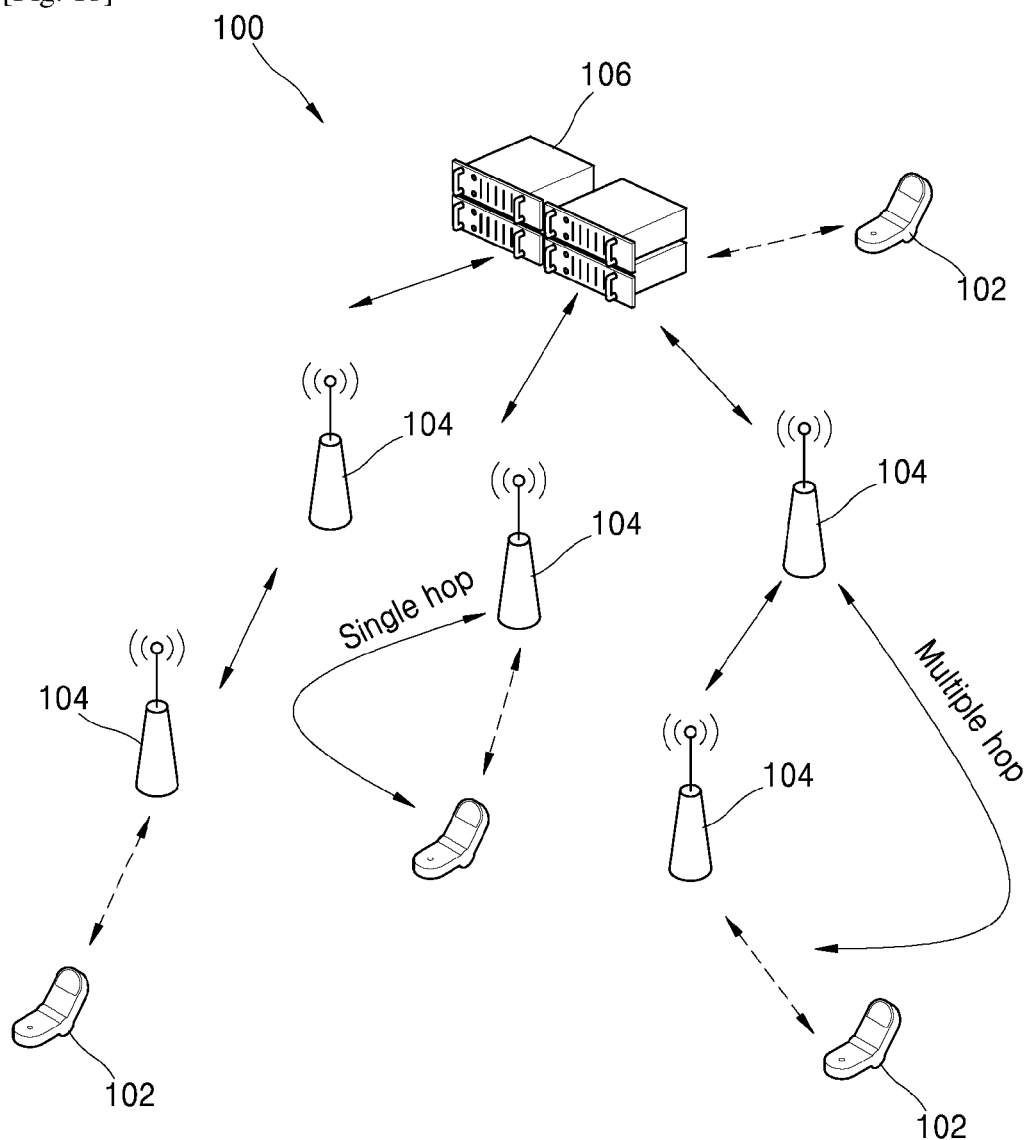

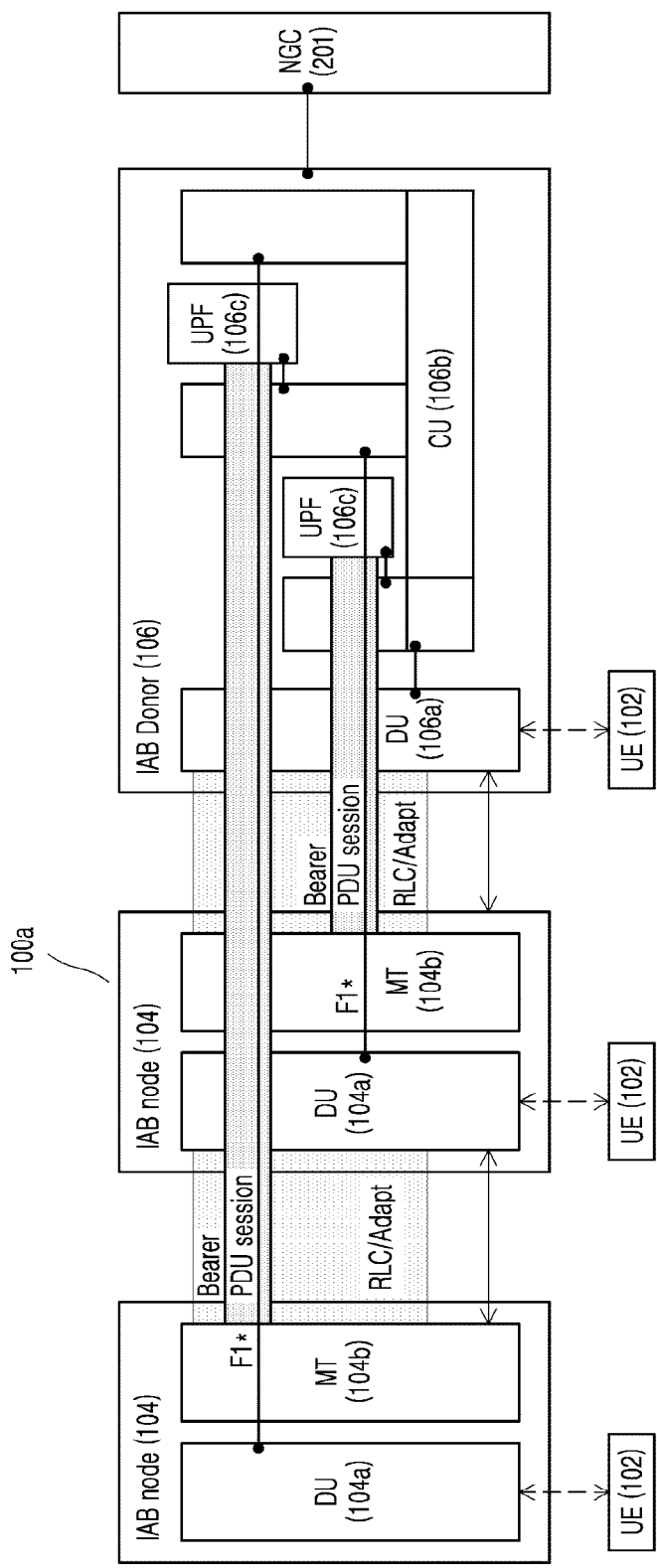
[Fig. 2b]

[Fig. 2c]
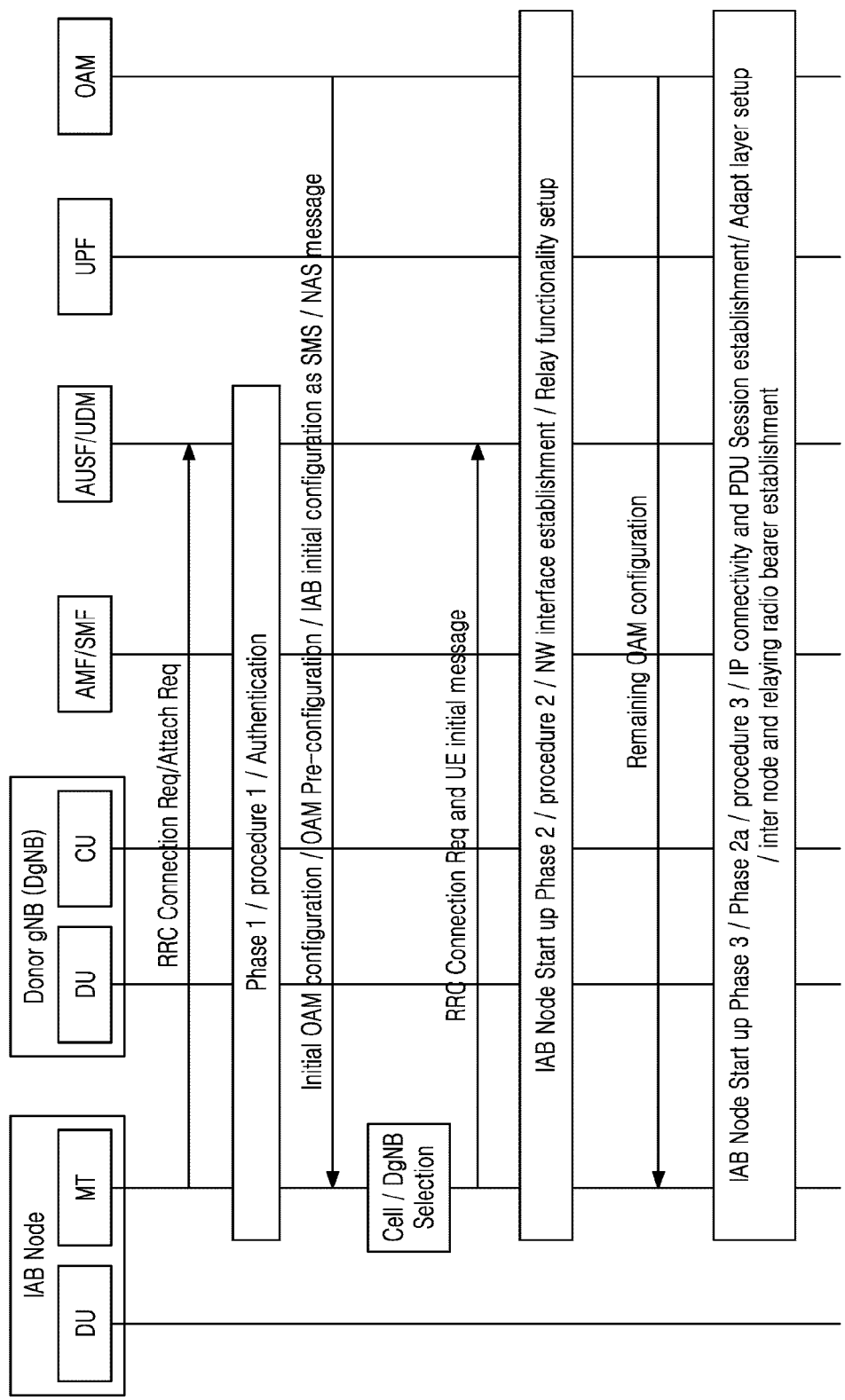

[Fig. 2d]
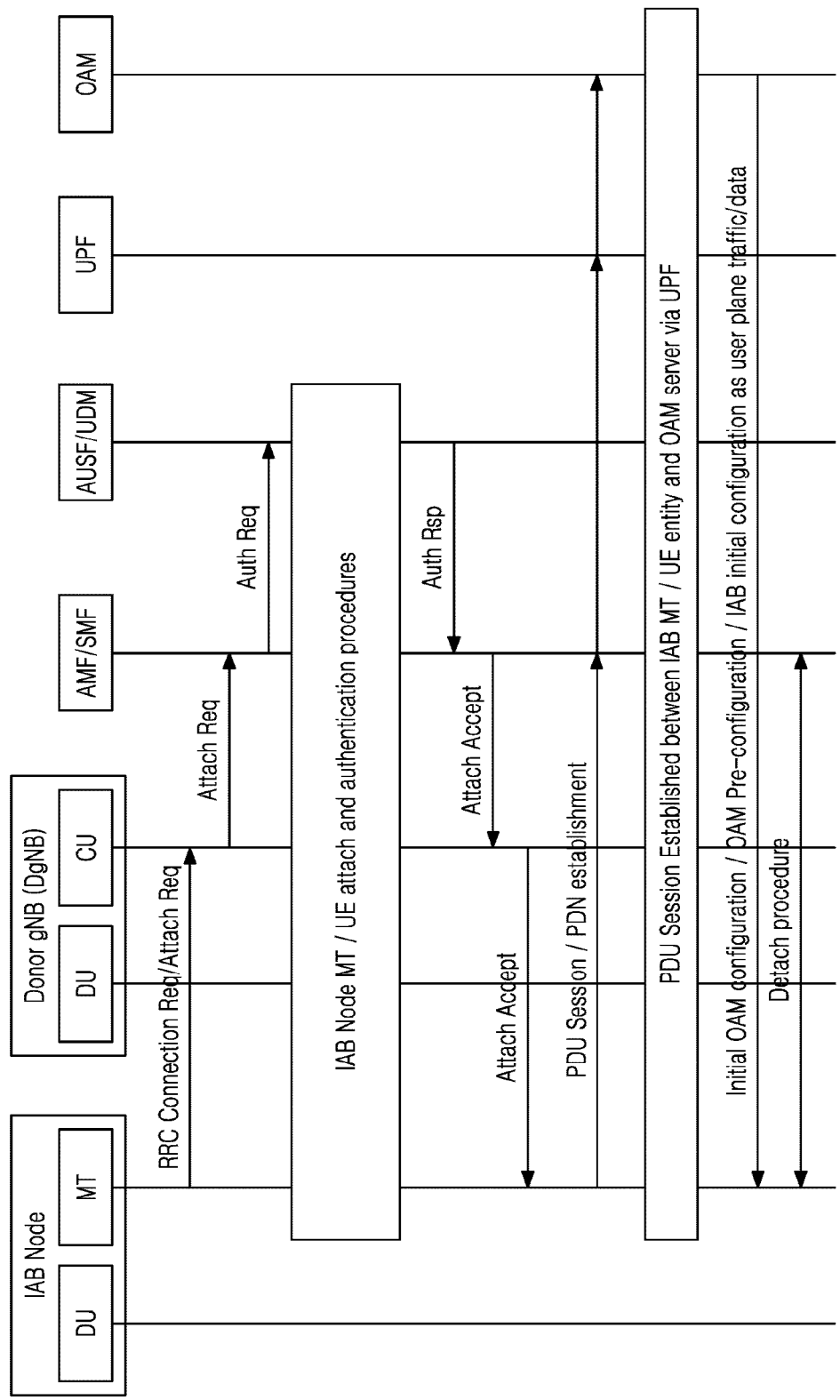

[Fig. 2e]
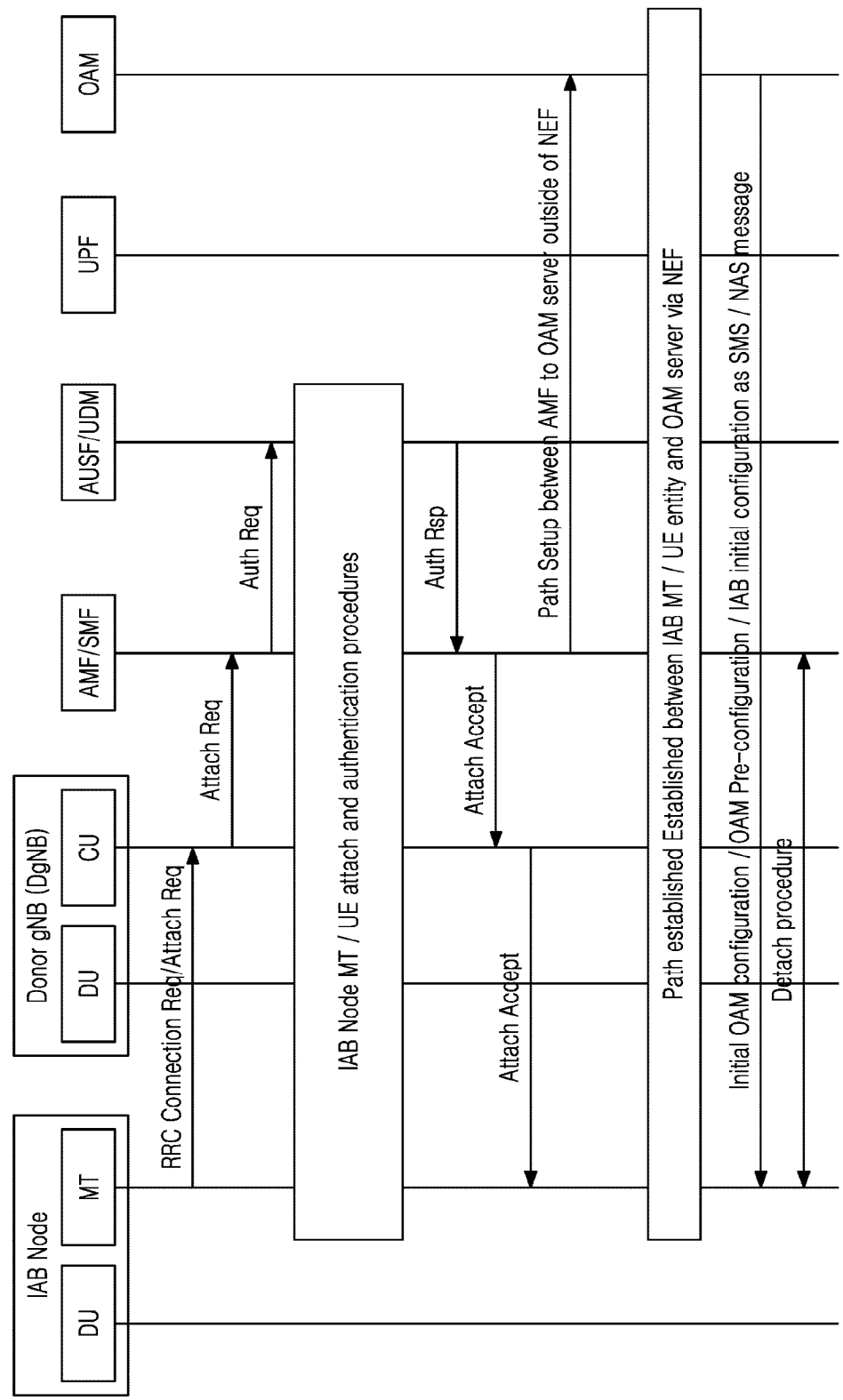

[Fig. 2f]
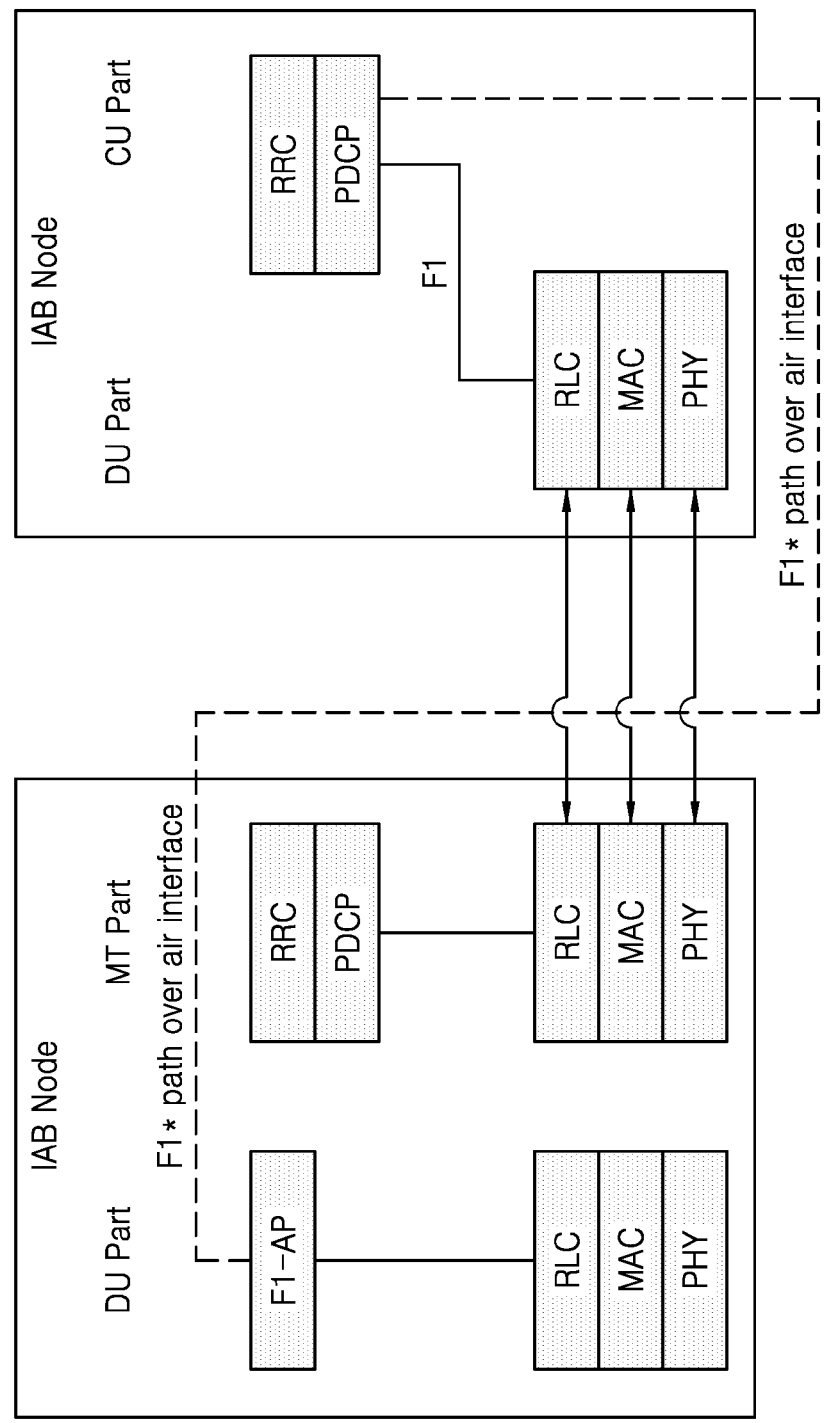

[Fig. 2g]
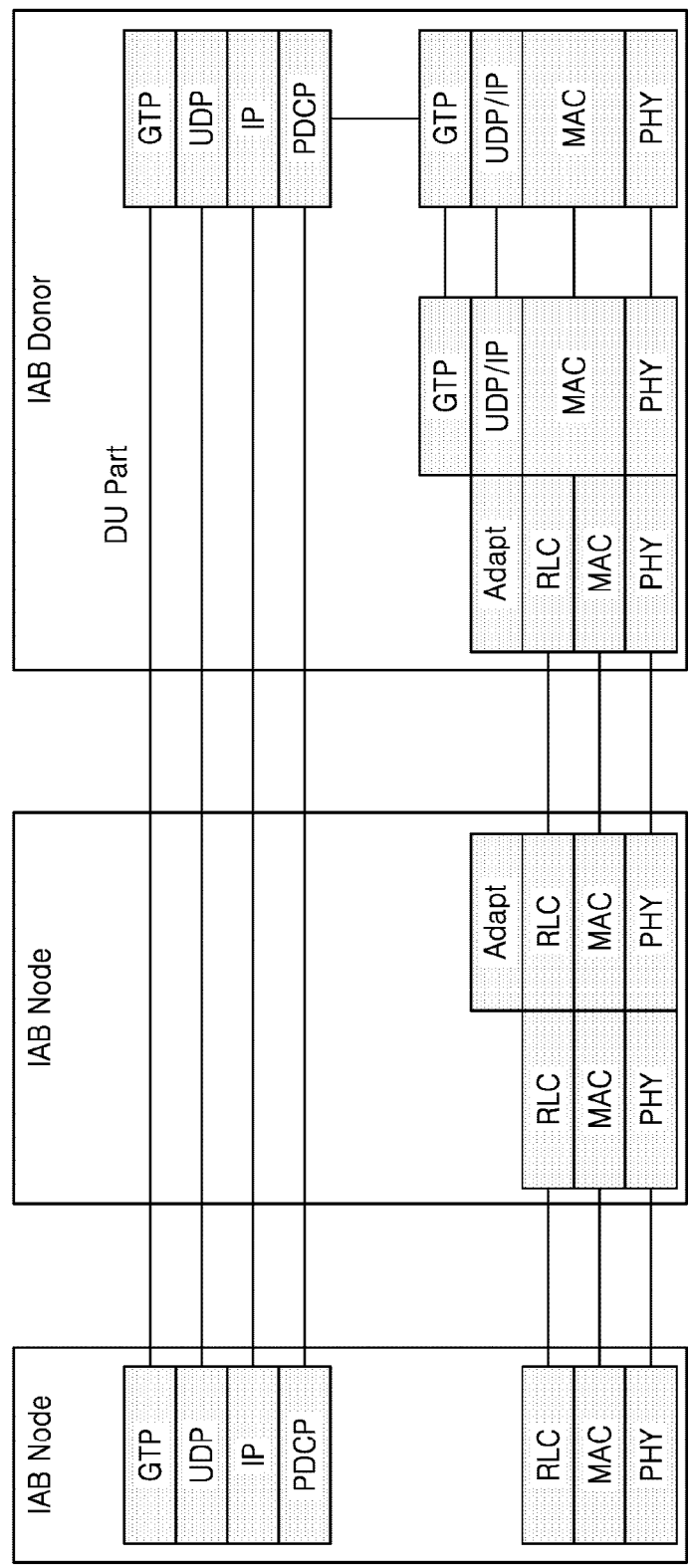

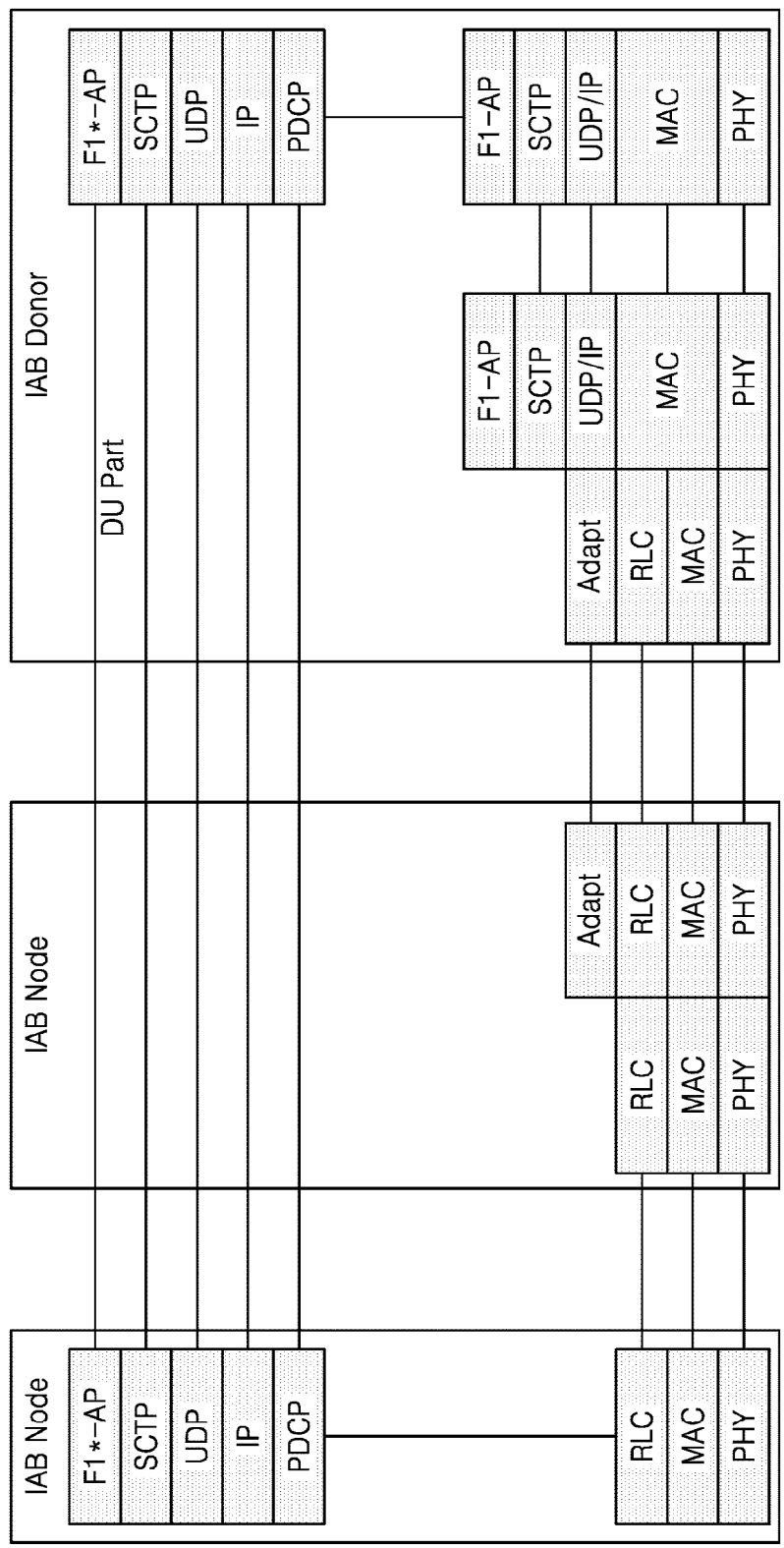
[Fig. 2h]

[Fig. 3a]
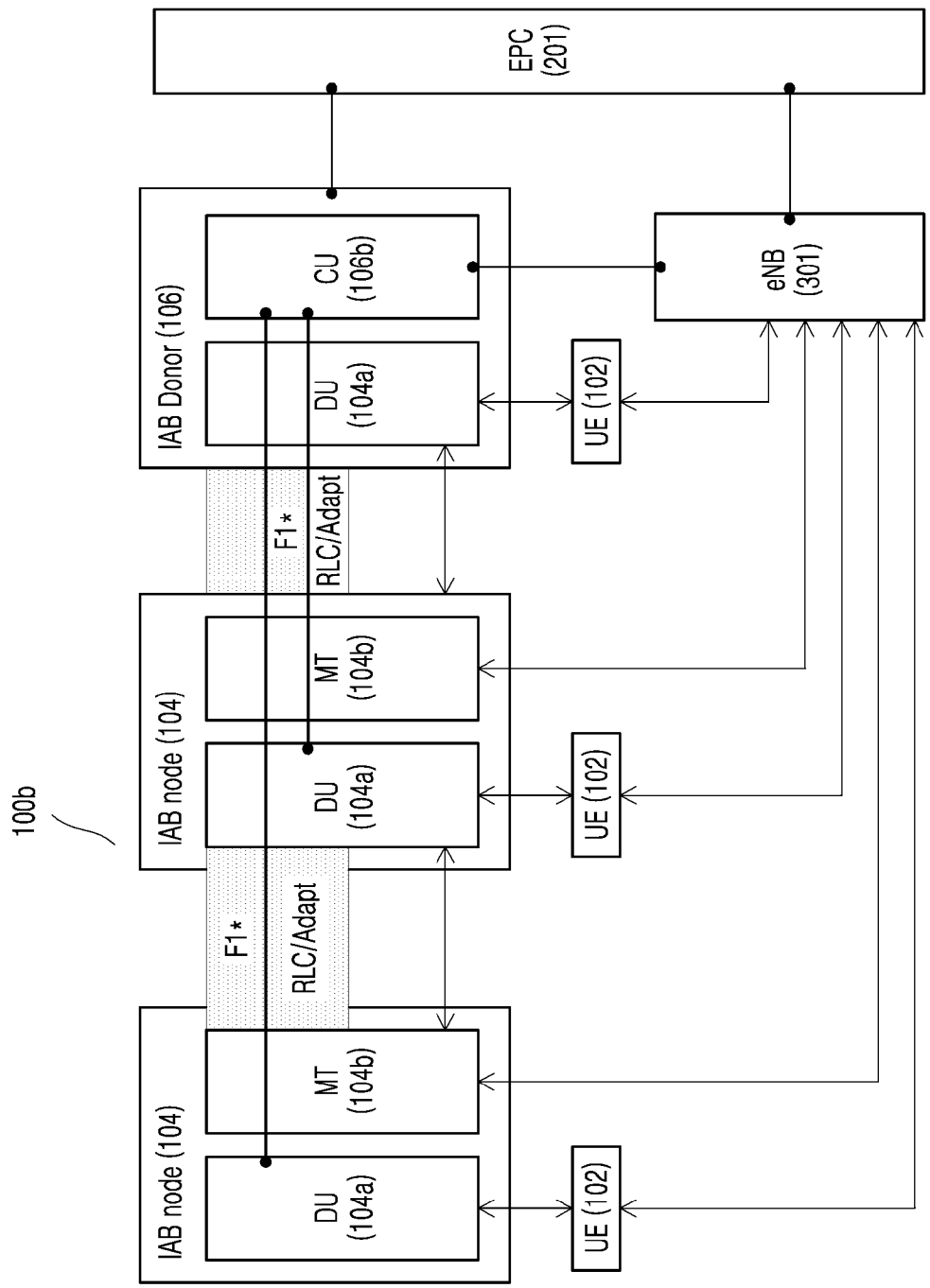

[Fig. 3b]
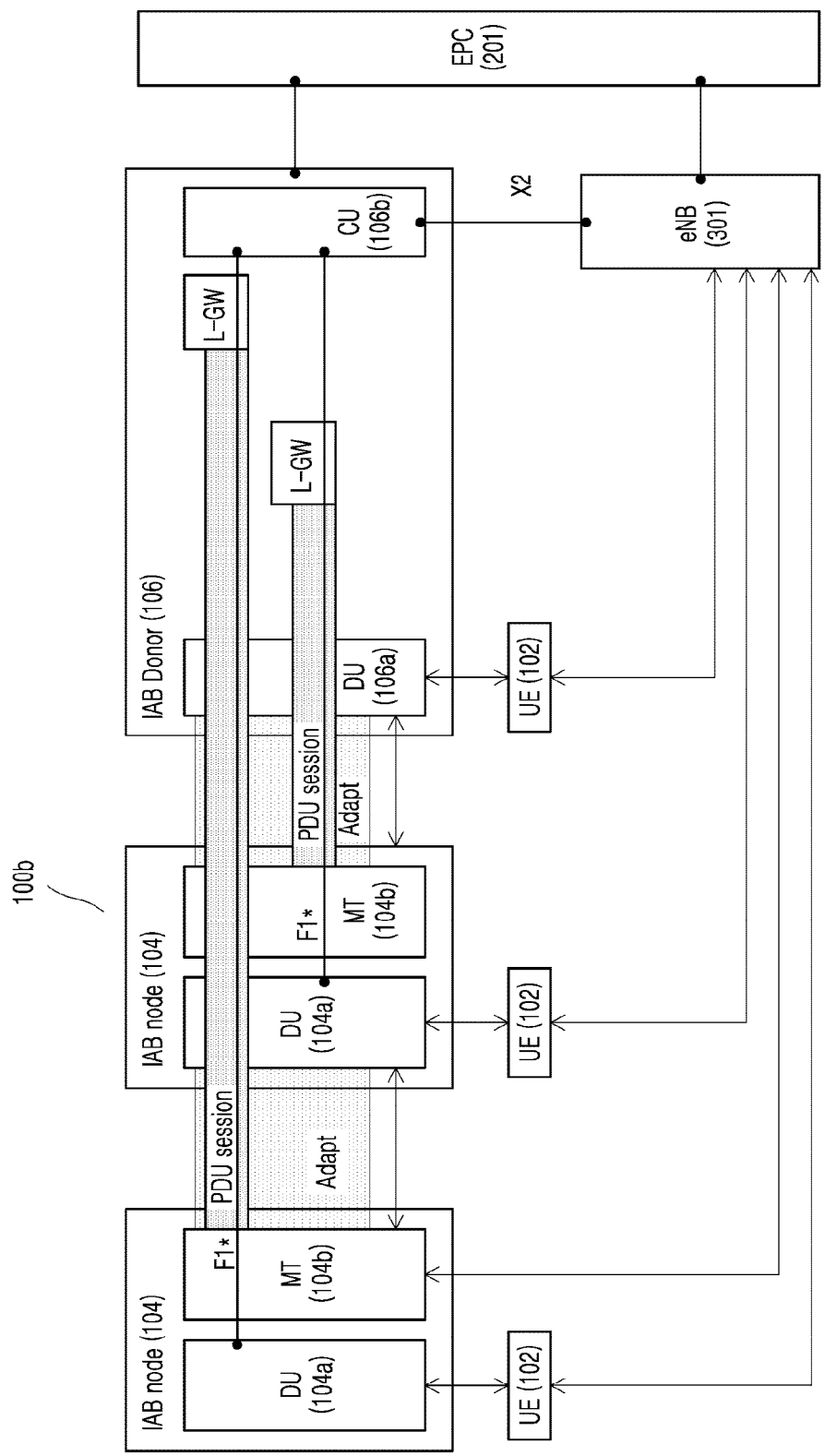

[Fig. 3c]
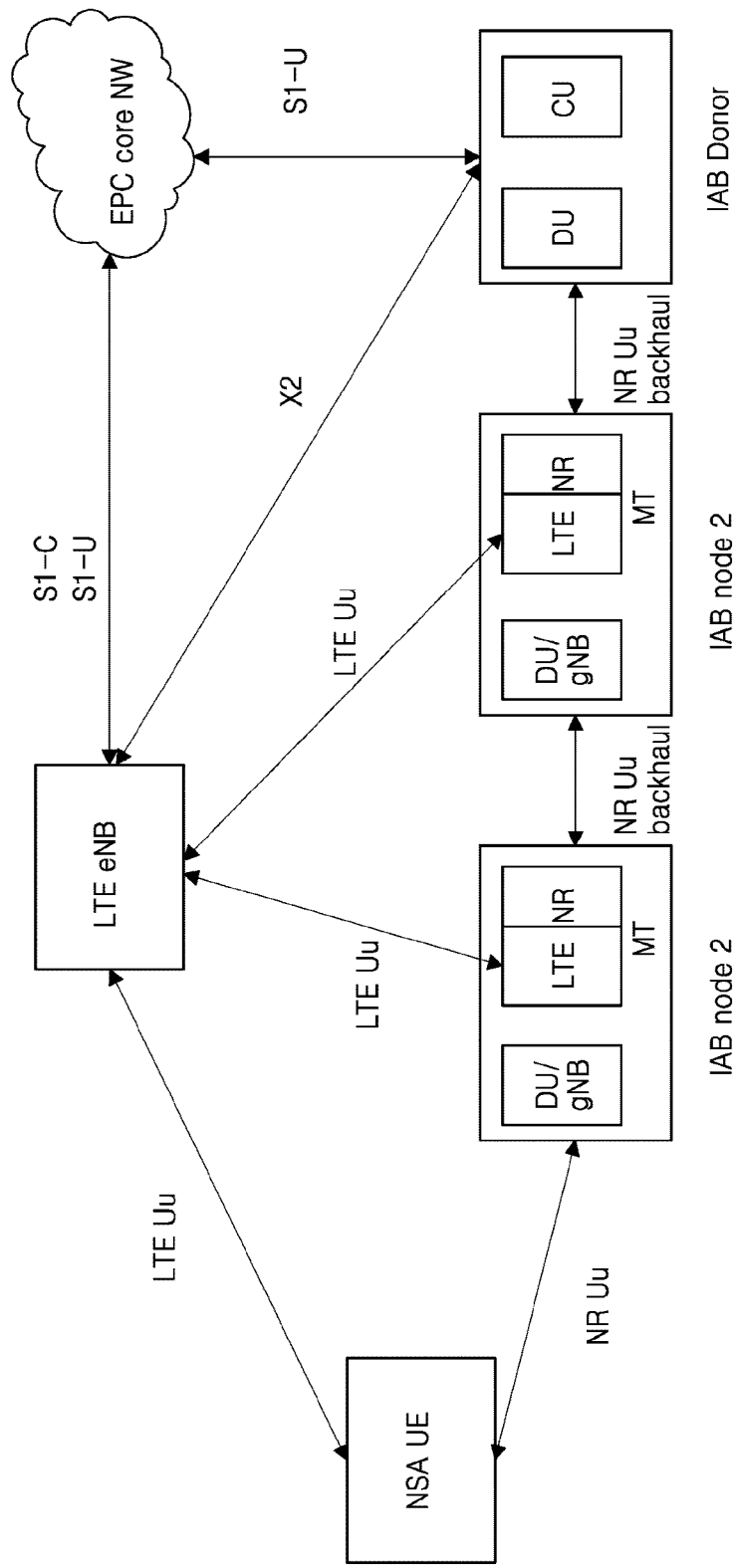

[Fig. 3d]
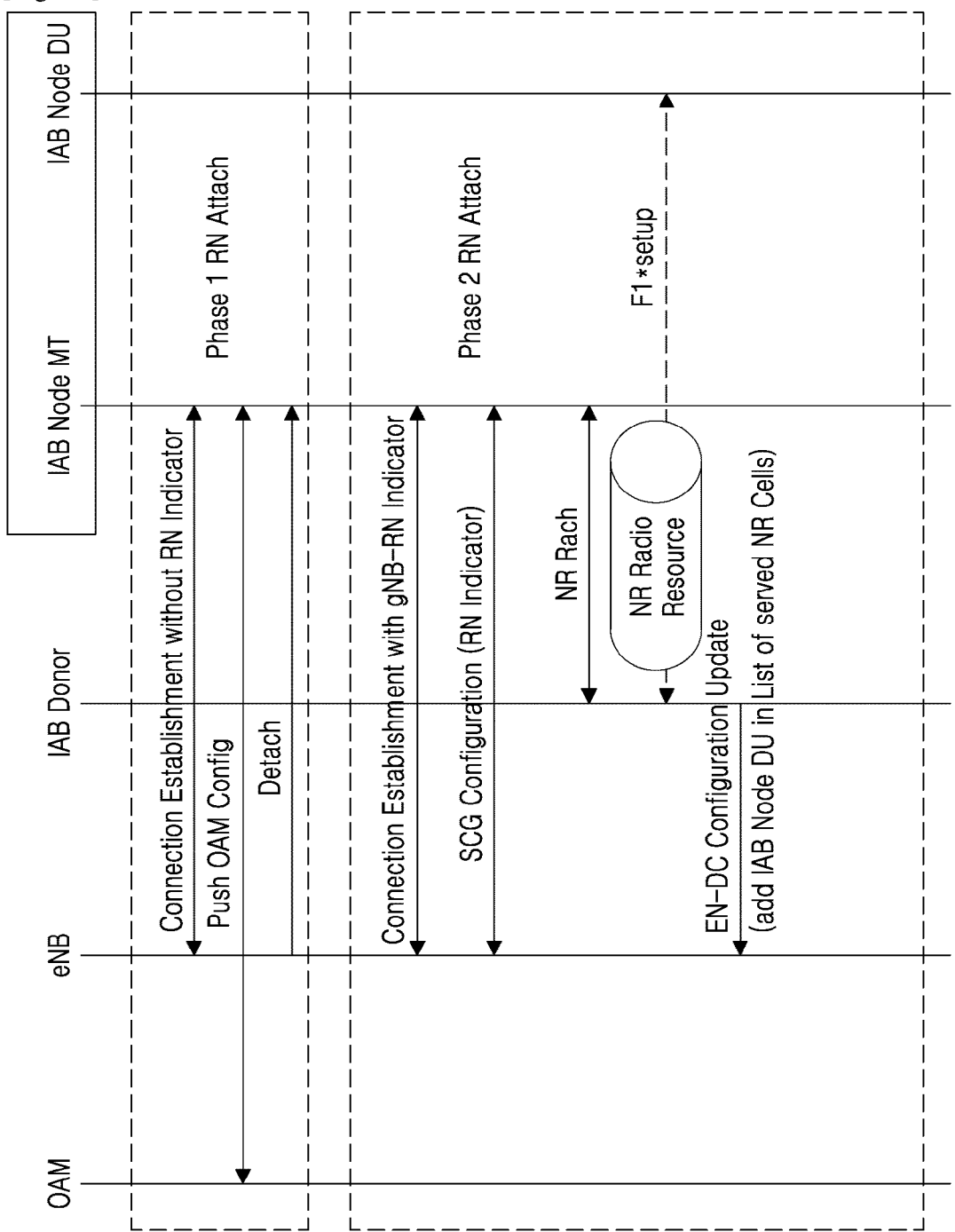

[Fig. 4]
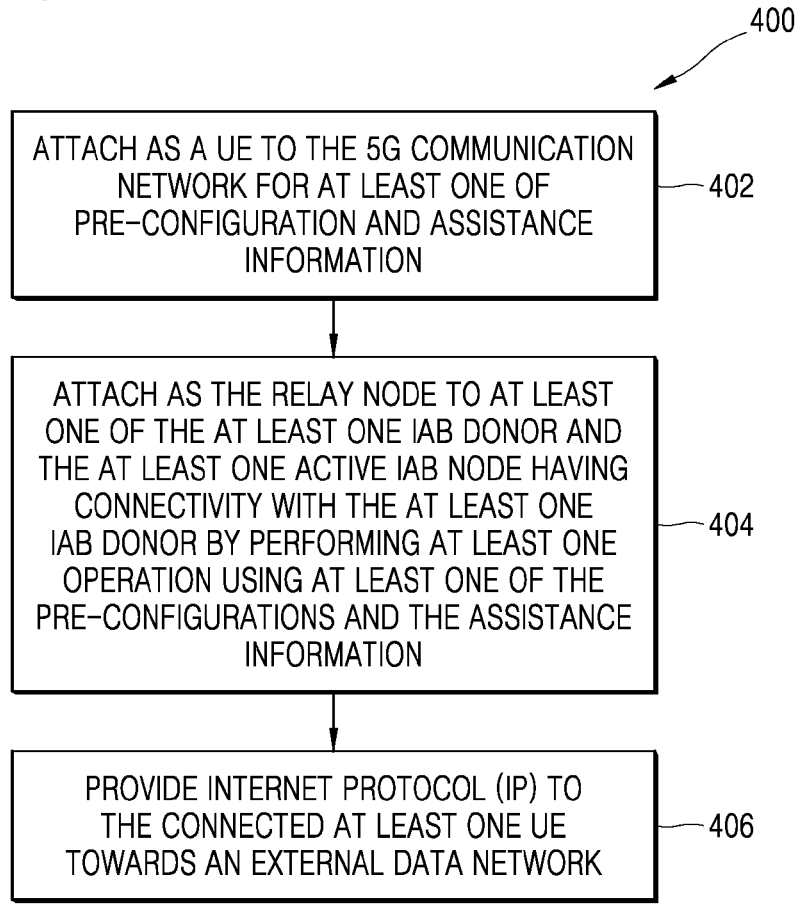
[Fig. 5]
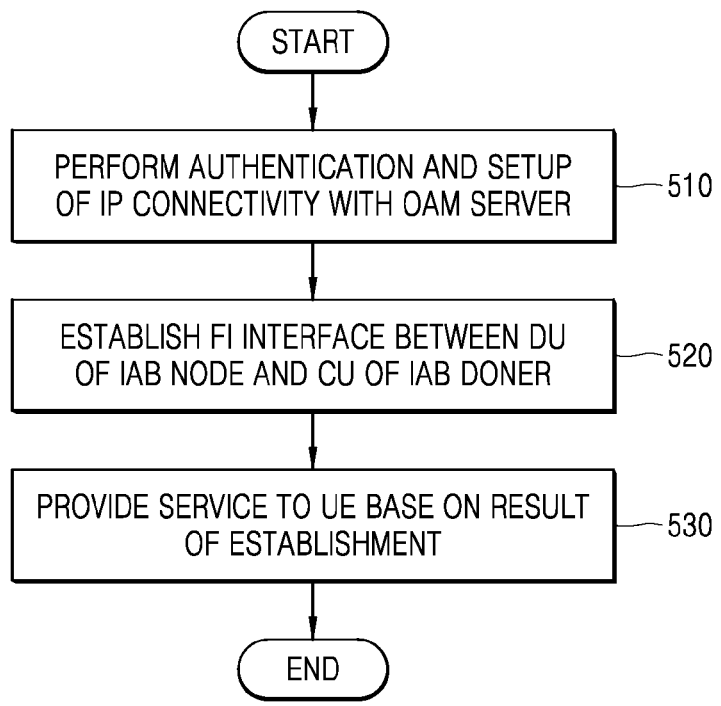

[Fig. 6]
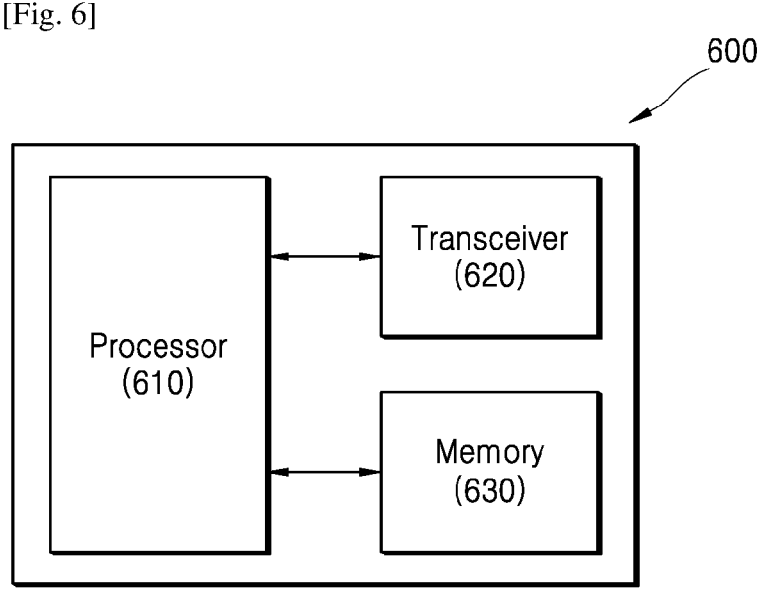

METHOD AND APPARATUS FOR PERFORMING COMMUNICATION IN WIRELESS COMMUNICATION SYSTEM

CROSS-REFERENCE TO RELATED APPLICATIONS

This application is a 371 of International Application No. PCT/KR2019/005672 filed on May 10, 2019, which claims priority to India Patent Application No. 201841017695 filed on May 10, 2018, India Patent Application No. 201841017696 filed on May 10, 2018, and India Patent Application No. 201841017695 filed on May 9, 2019, the disclosures of which are herein incorporated by reference in their entireties.

BACKGROUND

1. Field

The present disclosure relates to the field of 5G communication networks and more particularly to managing operations of Integrated Access Backhaul (IAB) nodes in a 5G communication network.

2. Description of Related Art

To meet the demand for wireless data traffic having increased since deployment of 4th generation (4G) communication systems, efforts have been made to develop an improved 5th generation (5G) or pre-5G communication system. The 5G or pre-5G communication system is also called a 'beyond 4G network' or a 'post long term evolution (LTE) system'. The 5G communication system is considered to be implemented in higher frequency (mmWave) bands, e.g., 60 GHz bands, so as to accomplish higher data rates. To decrease propagation loss of the radio waves and increase the transmission distance, beamforming, massive multiple-input multiple-output (MIMO), full dimensional MIMO (FD-MIMO), array antenna, analog beamforming, and large scale antenna techniques are discussed with respect to 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid frequency shift keying (FSK) and Feher's quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology" and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, MTC, and M2M communication may be implemented by beamforming, MIMO, and array antennas. Application of a cloud RAN as the above-described big data processing technology may also be considered to be as an example of convergence between the 5G technology and the IoT technology.

As described above, various services can be provided according to the development of a wireless communication system, and thus a method for easily providing such services is required.

In a system where only a few of these RAN nodes have backhaul connectivity, the RAN nodes not having any backhaul connectivity have to route their traffic to a core network or a backhaul over the RAN nodes which have direct backhaul connectivity.

DETAILED DESCRIPTION

Provided are methods and apparatuses for performing a communication in a wireless communication system. An IAB node of performing a communication, according to an embodiment, includes a transceiver and a processor coupled with the transceiver and configured to perform an authentication and a setup of an IP connectivity with an OAM (operations, administration and maintenance) server, in response to an architecture in which a DU (distribution unit) and a CU (central unit) are split, establish a F1 interface between a DU of the IAB node and a CU of an IAB donor, and provide a service to a UE based on a result of the establishment.

BRIEF DESCRIPTION OF THE DRAWINGS

Embodiments herein are illustrated in the accompanying drawings, throughout which like reference letters indicate corresponding parts in the various figures. The embodiments herein will be better understood from the following description with reference to the drawings, in which:

FIGS. 1a and 1b depict a communication network, according to embodiments as disclosed herein;

FIGS. 2a and 2b depict a 5G standalone network, according to embodiments as disclosed herein;

FIG. 2c is an example diagram illustrating startup procedures performed by at least one Integrated Access Backhaul (IAB) node to provide relaying functionalities to at least one User Equipment (UE) in the 5G standalone network, according to embodiments as disclosed herein;

FIG. 2d is an example diagram illustrating an attach procedure for the IAB node as the UE when an operations, administration and management (OAM) server is deployed beyond a User Plane Function (UPF) of a core network, according to embodiments as disclosed herein;

FIG. 2e is an example diagram illustrating an attach procedure for the IAB node as the UE when the OAM server is deployed beyond Network Exposure Function (NEF), according to embodiments as disclosed herein;

FIG. 2f is an example diagram illustrating a F1* network interface established between the IAB node and a IAB donor, according to embodiments as disclosed herein;

FIG. 2g is an example diagram illustrating an example protocol stack architecture for a F1-U/F1*-U network interface established between the IAB node and connected IAB donor, according to embodiments as disclosed herein;

FIG. 2h is an example diagram illustrating an example protocol stack architecture for a F1-C/F1*-C network interface established between the IAB node and the connected IAB donor, according to embodiments as disclosed herein;

FIGS. 3a and 3b depict a 5G non-standalone (NSA) network, according to embodiments as disclosed herein;

FIG. 3c depict an operation of the IAB node in the 5G NSA network, according to embodiments as disclosed herein;

FIG. 3d is an example diagram illustrating a Relaying Node (RN) attach procedure performed by the IAB node to act as the relay node, according to embodiments as disclosed herein; and FIG. 4 is a flow diagram illustrating a method for managing operations of the IAB node in a communication network, according to embodiments as disclosed herein.

FIG. 5 is a flow diagram illustrating a method for performing a communication of the IAB node in a wireless communication system, according to embodiments as disclosed herein.

FIG. 6 is a diagram illustrating an IAB node according to embodiments as disclosed herein.

DETAILED DESCRIPTION

Figure 2A:
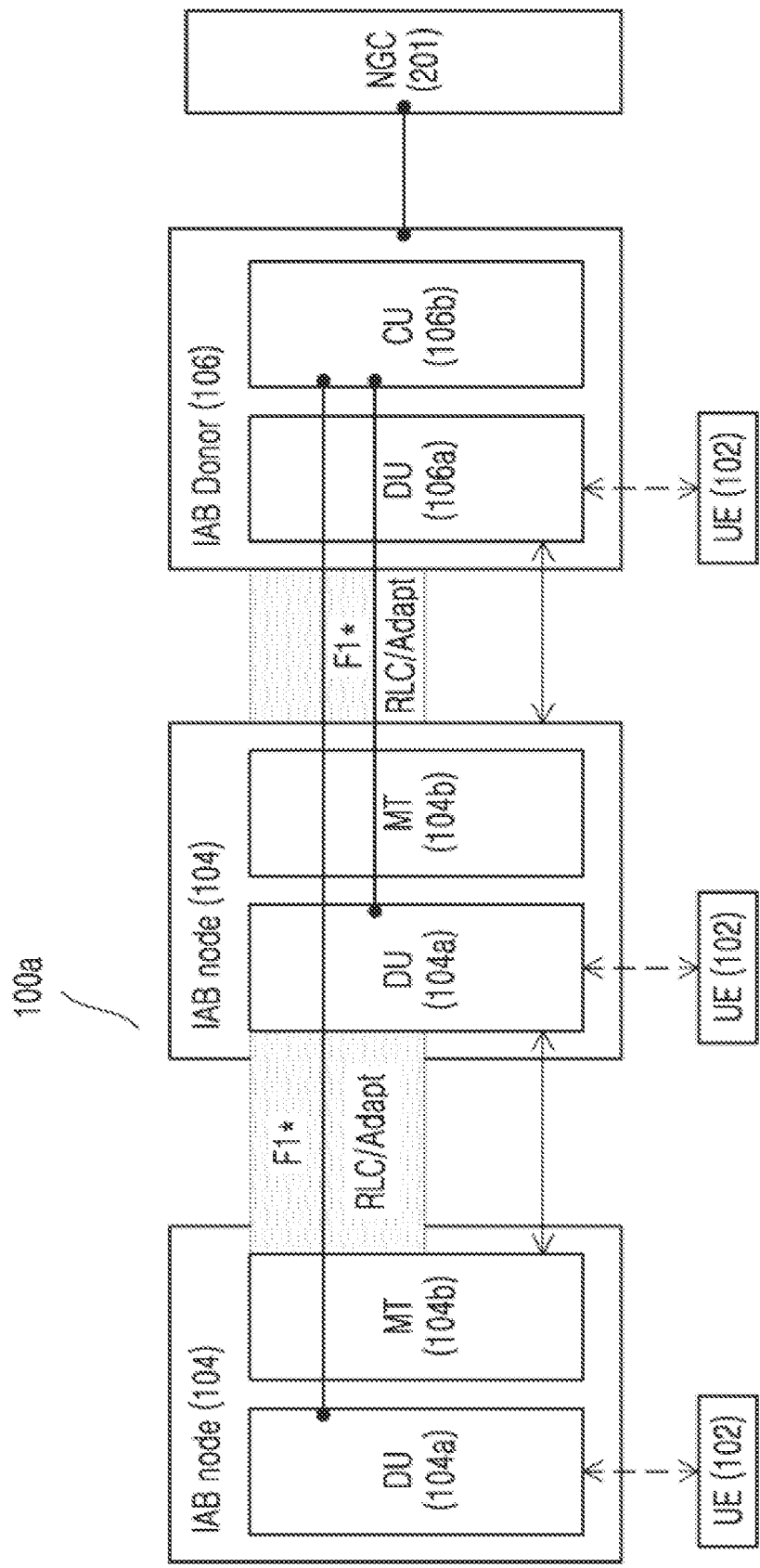

The principal object of the embodiments herein is to disclose methods and systems for managing operations of Integrated Access Backhaul (IAB) nodes in a communication network, wherein the communication network is at least one of a Fifth Generation (5G) standalone network and a 5G non-standalone (NAS) network.

Another object of the embodiments herein is to disclose methods and systems for enabling the at least one IAB node to attach with the communication network as a normal User Equipment (UE) for pre-configurations, wherein the pre-configurations are required for the IAB node to act as a relay node.

Another object of the embodiments herein is to disclose methods and systems for enabling the at least one IAB node to act as a relay node by performing at least one operation, wherein the at least one operation includes indicating its relaying capability to elements of a core network in order to be authenticated as the relay node, setting up a Radio Access Node (RAN) part by selecting at least one of at least one other IAB node (active IAB node) and an IAB donor using the pre-configurations and setting up a direct F1* network interface with the IAB donor.

Another object of the embodiments herein is to disclose methods and systems for enabling the at least one IAB node to provide IP connectivity for at least one connected UE by establishing a Protocol Data Unit (PDU) session towards an external data network.

To achieve the objective above, the present application adopts the following technical solutions: an IAB node of performing a communication, the IAB node comprising: a transceiver; and a processor coupled with the transceiver and configured to: perform an authentication and a setup of an IP connectivity with an OAM (operations, administration and maintenance) server, in response to an architecture in which a DU (distribution unit) and a CU (central unit) are split, establish a F1 interface between a DU of the IAB node and a CU of an IAB donor, and provide a service to a UE based on a result of the establishment.

Preferably, the processor controls the transceiver to receive information regarding an OAM configuration from the OAM server via the IP connectivity.

Preferably, the processor selects a serving node as an IAB donor or an other IAB node among at least one discovered serving node.

Preferably, the processor selects a next hop node for a data transmission among a plurality of next hop nodes based on a cost metric.

Preferably, a PDU session is established between the IAB node and the OAM server.

Preferably, information transmitted on an adaptation layer includes identification information specifying a UE bearer and QoS (Quality of Service) information.

Preferably, a signaling between a MT (mobile termination) on the IAB-node and a CU-CP of an IAB-donor using RRC protocol is carried over SRB (signaling radio bearer).

In accordance with an aspect of the disclosure, a method of performing a communication, by an IAB node, the method comprising: performing an authentication and a setup of an IP connectivity with an OAM (operations, administration and maintenance) server; in response to an architecture in which a DU (distribution unit) and a CU (central unit) are split, establish a F1 interface between the DU of the IAB node and a CU of an IAB donor; and providing a service to a UE based on a result of the establishment.

Accordingly, the embodiments herein provide methods and systems for managing operations of Integrated Access Backhaul (IAB) nodes in a communication network. A method disclosed herein includes attaching, by at least one IAB node, as a User Equipment (UE) to the communication network for at least one of pre-configuration and assistance information. The method further includes attaching, by the at least one IAB node, as the relay node to at least one of at least one IAB donor and at least one active IAB node having connectivity with the at least one IAB donor by performing at least one operation using at least one of the pre-configurations and the assistance information. The at least one operation includes indicating relaying capability to at least one network node to be authenticated as the relay node, selecting and attaching to at least one of the at least one IAB donor and the at least one active IAB node having connectivity with the at least one IAB donor as the relay node using the at least one of the pre-configurations and the assistance information and setting up a Radio Access Network (RAN) part and a direct F1* network interface with the at least one IAB donor. The method further includes establishing, by the at least one IAB node, a Protocol Data Unit (PDU) session with the at least one IAB donor in order to provide Internet Protocol (IP) connectivity to connected at least one UE towards an external data network.

Accordingly, embodiments herein provide a communication network comprising at least one User Equipment (UE), a core network, at least one Integrated Access Backhaul (IAB) donor connected to the core network, at least one active IAB node having connectivity with the at least one IAB donor and at least one IAB node. The IAB node is configured for attaching as a User Equipment (UE) to the communication network for at least one of pre-configurations and assistance information. The IAB node is further configured for attaching as the relay node to at least one of at least one IAB donor and at least one active IAB node having connectivity with the at least one IAB donor by performing at least one operation using at least one of the pre-configurations and the assistance information. The at least one operation includes indicating relaying capability to at least one network node to be authenticated as the relay node, selecting and attaching to at least one of the at least one IAB donor and the at least one active IAB node having connectivity with the at least one IAB donor as the relay node using the at least one of the pre-configurations and the assistance information and setting up a Radio Access Network (RAN) part and a direct F1* network interface with the at least one IAB donor. The IAB node is further configured for establishing a Protocol Data Unit (PDU) session with the at least one IAB donor in order to provide Internet Protocol (IP) connectivity to the connected at least one UE towards an external data network.

These and other aspects of the example embodiments herein will be better appreciated and understood when considered in conjunction with the following description and the accompanying drawings. It should be understood, however, that the following descriptions, while indicating example embodiments and numerous specific details thereof, are given by way of illustration and not of limitation. Many changes and modifications may be made within the scope of the example embodiments herein without departing from the spirit thereof, and the example embodiments herein include all such modifications.

The example embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The description herein is intended merely to facilitate an understanding of ways in which the example embodiments herein can be practiced and to further enable those of skill in the art to practice the example embodiments herein. Accordingly, this disclosure should not be construed as limiting the scope of the example embodiments herein.

Embodiments herein disclose methods and systems for managing startup operations/procedures of Integrated Access Backhaul (IAB) nodes in a communication network, wherein the communication network is at least one of a Fifth Generation (5G) standalone network and a 5G non-standalone (NAS) network.

Referring now to the drawings, and more particularly to FIGS. 1a through 6, where similar reference characters denote corresponding features consistently throughout the figures, there are shown example embodiments.

In a 5G communication network, New Radio (NR) cells may be deployed in a varying range of carrier frequencies. These are broadly divided into a frequency range 1 for the NR cells deployed in carrier frequencies less than 6 GHz and a frequency range 2 for the NR cells deployed in carrier frequencies greater than 6 GHz. At higher carrier frequencies (carrier frequencies greater than 6 GHz), the coverage of the NR cells is relatively small, when the NR cells operate in millimeter waves. Thus, such a deployment leads to a telecommunication ecosystem where there are very small coverage NR cells that are densely deployed. Further, in such a deployment, having independent backhaul connectivity for each of the deployed NR cells or Radio Access Network (RAN) nodes leads to a very complex and expensive topology.

As a result, an ecosystem, where only a few of these RAN nodes have backhaul connectivity, is recommended. In such cases, the RAN nodes not having any backhaul connectivity have to route their traffic to a core network or a backhaul over the RAN nodes which have direct backhaul connectivity. The RAN nodes without direct backhaul connectivity serve as a relay and relay the data on to the other RAN nodes, which have direct backhaul connectivity. Such relay nodes are referred to as Integrated Access Backhaul (IAB) nodes. Using the IAB nodes enables a flexible and very dense deployment of NR cells, without increasing the density of the communication network proportionately. IAB nodes can be used in a diverse range of deployment scenarios, including support for outdoor small cell deployments, indoors, or even mobile relays (example: on buses or trains).

The IAB nodes can support access and backhaul in above-6 GHz- and sub-6 GHz spectrum. User Equipment's (UEs) can transparently connect to an IAB-node via an access NR. Further, legacy Long Term Evolution (LTE) UEs can transparently connect to the IAB-node via LTE, in case, the IAB supports backhauling of LTE access. Further, the IAB nodes support multiple hops between the IAB nodes to which a UE is connected to and an IAB node with backhaul connectivity. This creates a multi hop backhauling where data from the IAB node is relayed over multiple other IAB nodes before eventually arriving at the IAB node with the backhaul connectivity. Thus, the multi-hop backhauling provides more range extension than a single hop and especially beneficial for above 6 GHz frequencies due to a limited frequency range. In addition, the multi-hop backhauling enables backhauling around obstacles (for example: buildings in urban environment for in-clutter deployments). A maximum number of hops can be expected to depend on multiple factors such as frequency, cell density, propagation environment, traffic load or the like. The factors are further expected to change over time.

FIGS. 1a and 1b depict a communication network 100, according to embodiments as disclosed herein. The communication network 100 referred herein can be a New Radio (5G) communication network 100. As illustrated in FIGS. 1a and 1b, the communication network 100 includes User Equipment's (UEs) 102, Integrated Access Backhaul (IAB) nodes 104 and IAB donors 106 connected with a core network 201. The communication network 100 referred herein can support a multi-hop relay environment. In the multi-hop relay environment, a connection can be established between the UEs 102 and an external data network for connecting with the core network 201, wherein multiple hops are present between the IAB nodes 104 to which the UEs 102 is connected to and the IAB donor(s) 106. Examples of the external data network can be, but not limited to, the Internet, a Public Data Network (PDN), an IP Multimedia Core Network Subsystem or the like. In the multi-hop relay environment, data belonging to the UE(s) 102 from the IAB node(s) 104 can be relayed over multiple other IAB nodes 104 (hereinafter referred to as intermediate IAB nodes) before eventually arriving at the IAB donor(s) 106, which further communicates the data of the IAB node 104 with the core network 201. The core network 201 further forwards data of the UE(s) 102 to the external data network.

In an embodiment, the communication network 100 referred herein can be a New Radio (5G) standalone network 100a that uses only one radio access technology (RAT) to provide radio access to the UEs 102. In an example herein, the 5G standalone network 100a uses the 5G RAT. Further, in the 5G standalone network 100a, 5G New Radio (NR)

cells (i.e., the IAB nodes 104/the IAB donor 106) and the core network 201 can be operated alone, wherein the core network 108 can be a new 5G core network (NGC) 201.

In an embodiment, the communication network 100 referred herein can be a 5G non-standalone (NSA) network/E-UTRAN (Evolved-UMTS Terrestrial Radio Access Network) New Radio-Dual Connectivity (DC) network 100b that uses multiple RATs to provide radio access to the UEs 102. Embodiments herein use the terms "5G NSA network", "EN-DC network" and so on interchangeably to refer to the 5G communication network that uses multiple RATs for proving the radio access to the UEs 102. In an example herein, the 5G NSA network 100b uses New Radio (NR) cells (the IAB nodes/the IAN donor) and Long Term Evolution (LTE) radio cells (eNBs) to provide the radio access to the UEs 102. Further, in the 5G NSA network 100b, the core network 201 can be an Evolved Packet Core (EPC) network 201.

The UE(s) 102 referred herein can be a device with radio frequency (RF) processing capabilities. Examples of the UE 102 can be, but not limited to, a mobile phone, a smartphone, a tablet, a phablet, a personal digital assistant (PDA), a laptop, a computer, a wearable computing device, a vehicle infotainment device, an Internet of Things (IoT) device, a Wi-Fi router, a USB dongle, or any other processing devices capable of using the communication network. In an embodiment, the UE 102 can support the 5G RAT. In an embodiment, the UE 102 can support the 4G RAT. In an embodiment, the UE 102 can support dual connectivity by supporting both the 4G RAT and the 5G RAT. The UE 102 can be connected with at least one of at least one IAB node 104 and the at least one IAB donor 106 over an access NR Uu (air) interface for accessing the external data network.

The IAB donor(s) 106 can be a Radio Access Network (RAN) node that has backhaul connectivity to connect with the core network 201. The IAB donor 106 acts as a Donor gNodeB (DgNB) including data plane functionalities and control plane functionalities. Embodiments herein use the terms "IAB donor", "RAN node", "DgNB", "donor IAB" and so on interchangeably to refer to the RAN node including the data plane functionalities and the control plane functionalities. The IAB donor 106 serves as an interface for UE with the core network 201. The IAB donor 106 may connect with the IAB nodes 104 over a NR backhaul Uu interface by providing wireless backhaul functionality to the IAB nodes 104. The IAB donor 106 may also connect with the UE(s) 102 over the access NR Uu interface. The IAB donor 106 may be configured to communicate at least one of data and control information received from at least one of the IAB node(s) 104 and the UE(s) 102 to the core network 201.

The IAB node 104 can be a gNodeB (gNB) including the data plane functionalities of the IAB donor/RAN node 106 and a protocol stack of a normal UE. Embodiments herein use the terms "IAB node", "intermediate node", "relay node", and so on interchangeably to a node including the data plane functionalities and the protocol stack of the normal UE. The IAB node 104 acts as the normal UE to at least one of the IAB donor 106 and at least one other IAB node 104. The at least one other node 104 can be referred hereinafter as an active IAB node 104 that has connectivity with the IAB donor 106. Embodiments herein use the terms such as "other IAB node", "parent node", "active node", "gNB" and so on interchangeably to refer to an IAB node that has connectivity with the IAB donor 106. The IAB node 104 connects to the at least one of the IAB donor 106 and at least one active IAB node 104 over a wireless interface. The wireless interface operates on the Uu air interface/NR backhaul Uu interface. The IAB node 104 can also act as a RAN node/gNB node to the UEs 102 that are connected to the IAB node 104 for availing services from the external data network. The IAB node 104 connects with the UE(s) 102 over the access NR Uu interface (the wireless interface). The IAB node 104 can be configured to act as a relay node between the UE(s) 102 and the IAB donor 106. The IAB node 104 relays control plane and data plane traffic received from at least one of the UE(s) 104 and the serving/connected IAB nodes 104 over the at least one active IAB node 104 before eventually arriving at the IAB donor 106 by creating the multiple hops. The IAB node 104 can also relay the control plane and data plane traffic received from at least one of the UE(s) 104 and the serving/connected IAB nodes 104 to the IAB donor 106 by creating the single hop.

In order to act as the relay node, the IAB node 104 may attach to the communication network 100 and be authenticated as a valid network node and as a node that can provide relaying functionality. Procedures/operations performed by the IAB node 104 for setting up as the relay node to provide the relay functionalities to the UE(s) 102 are referred as a startup procedure or a setup procedure. Embodiments herein uses the terms such as "startup procedure", "setup procedure", "startup operation", "setup operation" and so on interchangeably to refer to the operations/procedures performed by the IAB node 104 for setting up as the relay node. The operations of the startup procedure can be, but not limited to, the IAB node configuration reception, IAB node authentication, provisioning of IP connectivity or data path for transporting user traffic to the associated data network and so on. In an embodiment, the operations of the startup procedure can be carried out/performed by the IAB node 104 in multiple phases and such a startup procedure can be referred as a multi-phase startup procedure. In the multi-phase startup procedure, different operations of the startup procedure can be carried out in different phases. In an embodiment, the operations of the startup procedure can be performed by the IAB node 104 in a single phase and such a startup procedure can be referred as a single-phase startup procedure. Embodiments herein are further explained considering the multi-phase startup procedure, but it may be obvious to a person skilled in the art that the embodiments herein can be implemented for single-phase startup procedure.

In an example embodiment herein, the IAB node 104 performs the operations of the startup procedure in three phases; a phase 1/procedure 1, a phase 2/procedure 2 and a phase 2/procedure 3. It should be noted that in embodiments herein, the terms 'phase number' and 'procedure number' are used interchangeably.

In an embodiment, the IAB node 104 performs the operations of the phase 1 to attach to the communication network 100 as the UE for receiving pre-configurations that are required for the IAB node 104 to operate as the relay node. The pre-configurations can be received from an operations, administration and management server (OAM server) (not shown) associated with the core network 201. The OAM server includes processes, activities, tools, and standards required for operating, administering, managing and maintaining the IAB nodes 104. The IAB node 104 can also receive assistance information along with the pre-configurations from the OAM server. The pre-configurations and the assistance information can include information such as, but not limited to, a list of IAB donors 106, a list of active IAB nodes 104, frequency and public land mobile network (PLMN) where the IAB donor 106 and the IAB nodes 104 operate, a maximum number of hops allowed for routing/ path, a measurement threshold to prioritize hops count over measurement results, an allowed list of services per IAB node and/or the IAB donor 106 and so on. The pre-configurations are generally referred to as IAB pre-configurations that are required by the IAB node 104 prior to operating as the relay node. Embodiments herein use the terms "pre-configurations", "OAM configurations", "IAB pre-configurations" and so on interchangeably to refer to configurations required by the IAB node 104 to act as the relay node.

Based on the pre-configurations, the IAB 104 can be aware of how to select at least one of the at least one active IAB node 104 and the IAB donor 106, in order to complete additional procedures/operations (of the phase 2 and the phase 3) related to the IAB startup and eventually function as the relay node. After performing the operations/procedures of the phase 1, the IAB node 104 (acting as the UE) may optionally choose to detach from the communication network 100. However, in the single-phase startup procedure, the IAB node does not detach from the network on completion of the phase 1.

On attaching to the communication network 100 as the UE, the IAB node 104 performs the operations of the phase 2 to act as the relay node for the UE(s) 102. In an embodiment, the operations of the phase 2 can comprise of the IAB node 104 indicating its relaying capabilities to network nodes (such as the at least one active IAB node, the IAB donor 106 and the elements of the core network 201). Using the received information from the IAB node 104, the network nodes can authenticate the IAB node 104 as the relay node. After authenticating as the relay node, the IAB node 104 selects at least one of the at least one active IAB node 104 and the IAB donor 106, set up the RAN (the data plane functionalities) and set up a network interface with the IAB donor 104. In an embodiment, the network interface can be a F1* interface (modified version of an existing F1 interface), which is required for providing relaying functionalities to the UE(s) 102. In the phase 2, the IAB node 104 does not perform detach operation(s), irrespective of whether the startup procedure is the single-phase startup procedure or the multi-phase startup procedure.

After setting up the network interfaces towards the IAB donor 106, the IAB node 104 performs the operations of the phase 3 to establish Internet Protocol (IP) connectivity for the connected UE(s) 102 with the external data network (available with an operator deploying the IAB node 104). In an embodiment, the operation of the phase 3 involves establishing, by the IAB node 104, a Protocol Data Unit (PDU) session between the connected UE(s) 102 and the external data network/application servers. The PDU sessions can be used to relay packets between the external data network/application servers and the UE(s) 102 connected to the IAB node 104. Thus, the relaying functionalities provided by the IAB nodes 104 enable the operator to extend coverage and provide better Quality of Service (QoS) to the UEs 102.

FIGS. 1*a* and 1*b* show exemplary units/elements of the communication network 100, but it is to be understood that other embodiments are not limited thereon. In other embodiments, the communication network 100 may include less or more number of units. Further, the labels or names of the units are used only for illustrative purpose and does not limit the scope of the embodiments herein. One or more units can be combined together to perform same or substantially similar function in the communication network 100.

FIGS. 2*a* and 2*b* depict an example 5G standalone network 100*a*, according to embodiments as disclosed herein.

As illustrated in FIGS. 2*a* and 2*b*, the 5G standalone network 100*a* includes the UEs 102, the IAB nodes 104, the IAB donor 106 and the core network 201.

In the 5G standalone network 100*a*, the core network 201 can be the NGC 201. The NGC 201 includes entities and network functions such as, but not limited to, an Access and Mobility Management function (AMF) (manages control plane functionality), a Session Management Function (SMF) (manages user plane functionalities), a User Plane Function (UPF) (acts as an interface between the UEs 102 and the external data network), an Authentication Server Function (AUSF) and so on. Further, the NGC 201 can be associated with the OAM server. In an embodiment, the OAM server can be deployed beyond the UPF of the NGC 201. In an embodiment, the OAM server can be deployed beyond a Network Exposure Function (NEF) of the NR.

The IAB donor 106 includes a distributed unit (DU) 106*a* and a central unit (CU) 106*b*. The DU 106*a* can be a data plane entity and the CU 106*b* can be a control plane entity. The CU 106*b* can control operations of the DU 106*a*. The CU 106*b* can include a Radio Resource Control (RRC) layer, a Packet Data Convergence Protocol (PDCP) layer and so on of a NR protocol stack. The DU 106*a* includes a Physical layer (PHY layer), a Media Access Control (MAC) layer and a Radio Link Control (RLC) layer of a RAN protocol stack. Further, the CU 106*b* comprises a F1-C interface and a F1-U interface to communicate with the DU 106*a*. Further, the DU 106*a* comprises a F1-C interface and a F1-U interface to communicate with the CU 106*b*. The F1-C interface can be used to share control information between the CU 106*b* and the DU 106*a*. The F1-U interface can be used to share user plane information between the CU 106*b* and the DU 106*a*. In an embodiment, the CU 106*b* can includes a UPF 106*c* (of the core network 201), as illustrated in FIG. 2*b*.

The IAB node(s) 104 includes a DU 104*a* and a Mobile Terminal (MT) 104*b*. The DU 104*a* performs similar functions of the DU 106*a* of the IAB donor 106. The DU 104*a* includes an RLC layer, a MAC layer, and a PHY layer of the RAN protocol stack. In an embodiment, the DU 104*a* has the F1* network interface connectivity to the CU 106*b* of the IAB donor 106. In an embodiment, the F1* network interface is a modified version of the existing F1 interface. Further, messages related to the F1* interface can send over bearers (Signaling Radio Bearers (SRBs) and Data Radio Bearers (DRBs). Embodiments herein use the terms "F1* interface", "F1/F1* network interface" and so on interchangeably to refer to a logical channel that is connected directly between the DU 104*a* of the IAB node 104 and the CU 106*b* of the IAB donor 106 and whose messages can be carried over the bearers. Further, the DU 104*a* enables the IAB node 104 to act as the relay node for the UE(s) 102.

The MT 104*b* includes an RLC layer, a MAC layer, a PHY layer, a RRC layer and a PDCP layer of a UE protocol stack. The MT 104*b* sustains Non-Access Stratum (NAS) connectivity to the NGC 201. The MT 104*b* also enables the IAB node 104 to act as the UE for at least one of the other IAB node(s) 102 and the IAB donor 106. The IAB node 104 can communicate with the at least one of the active IAB node(s) 104 and the IAB donor 106 over the backhaul NR Uu. In an embodiment, the MT 104*b* of the IAB node 104 can also establish a PDU session with the UPF 106*c* of the CU 106*b* of the IAB donor 106. The PDU session serves as a point-to-point link between the DU 104*a* on the IAB node 104 and the CU 106*b* on the IAB donor 106.

Further, the IAB node 104 includes an adaption layer (adapt layer). The adapt layer can be configured at either the Du 104*a* or the MT 106*b*. The adapt layer can also configured on both the DU 104*a* and the MT 106*b*. The adapt layer can be configured to data forwarding and routing between the IAB node 104 and the other active IAB node(s) 104 and the IAB donor 106.

In order to provide the relaying functionalities to the connected UE(s) 102, the IAB node 104 performs the operations of the startup procedures in three phases (as illustrated in FIG. 2*c*). In the phase 1, the IAB node 104 attaches as the UE to the 5G standalone network 100*a* on receiving the pre-configurations and/or assistance information from the OAM server. In the phase 2, the IAB donor 104 uses the pre-configurations and/or assistance information and attaches to the at least one of the active IAB node 104 and the IAB donor 106 as the relay node. In the phase 3, the IAB donor 104 establishes the PDU session with the IAB donor 106 to serve the connected UE.

In the phase 1, the operations can include attaching, by the IAB node 104, as the normal UE to the 5G standalone network 100*a* and establishing a Packet Data Network (PDN) session with the OAM server to download the pre-configurations required for acting as the relay node. In an embodiment, to be authenticated as the valid node, the MT 104*b* of the IAB node 104 (acting as the UE) sends an attach request/a RRC connection request to the IAB donor 106 (as shown in FIGS. 2*d* and 2*e*). The CU 106*b* of the IAB donor 106 sends the received attach request to the AMF/SMF of the NGC 201. The AMF further forwards the attach request to the UDM/AUSF of the NGC 201. On receiving the attach request, the AUSF network function authenticates the IAB node 104 based on data (the subscription information of the IAB node 104 acting as the UE) received from the UDM network and updates the authentication status to the AMF. Once the authentication is successfully completed by the AUSF of the NGC 201, the MT 104*b* of the IAB node 104 (acting as the UE) receives an attach accept from the AMF through the IAB donor 106 indicating the successful authentication. Once the IAB node 104 is authenticated successfully, the IAB node 104 (acting as the UE) is required to receive the OAM configurations/pre-configurations in order to enable and assist itself to establishing connectivity with network nodes supporting relaying functionality. Examples of the network nodes can be, but is not limited to, the other IAB nodes 104, the IAB donor 106, the AMF of the NGC 201 and so on. The IAB node 104 can also receive assistance information, along with the pre-configurations from the OAM server. The pre-configurations and the assistance information can include information such as, but not limited to, a list of IAB donors 106, a list of active IAB nodes 104, frequency and public land mobile network (PLMN) where the IAB donor 106 and the IAB nodes operate, a maximum number of hops allowed for routing/path, a measurement threshold to prioritize hops count over measurement results, an allowed list of services per IAB node and/or the IAB donor 106 and so on. The pre-configurations can be received as a part of phase 1 operation (illustrated in below embodiments).

In an embodiment, the pre-configurations/OAM configurations can be predefined and stored in a non-volatile memory of the IAB node 104. Thus, the MT 104*b* of the IAB node 104 does not have to attach to the NGC 201 to establish a PDU session with the OAM server. In such cases, the IAB node 104 acting as the UE need not be authenticated and the PDU session need not be established to receive the OAM configurations (interchangeably referred as pre-configuration). However, when the pre-configurations are predefined/preconfigured in the IAB node 104, the MT 104*b* of the IAB node 104 performs cell selection on a cell that supports the relaying functionality.

In an embodiment, when the pre-configurations are not stored in the IAB node 104, then the MT 104*b* of the IAB node 104 acting as the UE may camp on to an available cell and attach to any AMF of the NGC 201, which can support the relaying functionalities. The MT 104*b* of the IAB node 104 (acting as the UE) may camp on to the available cell and the AMF irrespective of whether cell and the entities/functions of the NGC 201 support the relaying functionalities while attempting to receive the pre-configurations.

Delivery of the pre-configurations to the IAB node 104 (acting as the UE) depends on the deployment of the OAM server by the operator in the 5G standalone network. If the OAM server is connected to the UPF of the NGC 201, then the OAM performs an IP based packet delivery over the user plane to provide the pre-configurations to the IAB node 104. If OAM server is connected to the UPF or the NEF network functions (does not deployed beyond the UPF), then the OAM performs a non-IP based packet delivery over the control plane to provide the pre-configurations to the IAB node 104. In an embodiment, the IAB node 104 can receive the pre-configurations as IP data over a user plane. If the OAM server is deployed beyond the UPF in the 5G-standalone network architecture and topology, then the IAB node 104 receives the pre-configurations as IP packets as UPF can only carry IP packets. Embodiments herein further explained considering that the OAM server is deployed beyond the UPF (as illustrated in FIG. 2*d*). For pre-configurations, the MT 104*b* of the IAB node 104 (acting as the UE) initiates the PDU session establishment operation to connect with the OAM server based on the successful authentication. The MT 104*b* of the IAB node 104 (acting as the UE) sends a request to the AMF of the NGC 201 for the PDU session establishment. The requested PDU session can be established between the MT 104*b* of the IAB node 104 (acting as the UE) and the OAM server connected via the UPF of the NGC 201. On receiving the request from the MT 104*b* of the IAB node 104 (acting as the UE), the AMF of the NGC 201 selects the appropriate UPF that connects to the OAM server and completes the PDU session establishment by notifying the MT 104*b* of the IAB node 104 (acting as the UE) about a successful establishment. Once the PDU session is established, the OAM server sends the pre-configurations to the IAB node 104 (acting as the UE) as the IP packets over the user plane (as illustrated in FIG. 2*d*), since the OAM server is deployed beyond the UPF of the NGC 201. In an embodiment, the OAM server can send the pre-configurations to the IAB node 104 as a response to a request sent by the IAB node 104 (acting as the UE) after the successful establishment of the PDU session. In an embodiment, the OAM server sends the pre-configurations to the IAB node 104 (acting as the UE) automatically in response to the successful establishment of the PDU session.

In an embodiment, the IAB node 104 (acting as the UE) can receive the pre-configurations as non-IP packets over a control plane (in case of IoT (Internet of Things) services). If the OAM server is deployed beyond the NEF network function in the NR or has connectivity to the UPF of the NGC 201 (as illustrated in FIG. 2*e*), then the IAB node 104 (acting as the UE) can receive the pre-configurations as the non-IP packets over the control plane without establishing the PDU session with the OAM server after the successful authentication. In an embodiment, the IAB node 104 (acting as the UE) can receive the pre-configurations as a NAS message on at least one of an SRB. In an embodiment, the IAB node 104 can also receive the pre-configurations as a Short Messaging Service (SMS) (however, the SMS can be carried like the NAS message over the SRB and the SMS content can be forwarded to an OMA client of the IAB node 104 to apply the pre-configurations), but does not terminate at a NAS layer. The MT 104b of the IAB node 104 forwards the pre-configurations to the OAM client (not shown) embedded in the IAB node 104. The OAM client can be an application present in the IAB node 104 to retrieve the pre-configurations from the OMA server/UDM and apply the pre-configurations in the IAB node 104.

By performing the operations of the phase 1, the IAB node 104 can attach to the network 100a as the UE and receives the pre-configurations. However, attaching to the network 100a as the UE does not indicate that the IAB node 104 attached as the UE is capable of supporting the relaying functionalities. Thus, the IAB node 104 performs the operations of the phase 2 using the received pre-configurations to attach to the at least one of the other active IAB nodes 104 and the IAB donor 106 as the relay node. The operations of the phase 2 involves multiple procedures such as, but not limited to, authorizing, by the IAB node 104 as the relay node by indicating its relaying capability to the NGC 201, setting up, by the IAB node 104, the DU 104a, setting up, by the IAB node 104, the F1/F1*network interface between the DU 104a and the CU 106b of the IAB donor 106 and so on.

To be validated as the relay node, the IAB node 104 (attached as the UE) can be authenticated by the NGC 201. For authenticating the IAB node 104 as the relay node, different entities or different network functions of the NGC 201 are required to be made aware that the IAB node 104 (attached as the UE) can act as the relay node. Thus, the IAB node 104 is required to indicate its relaying capability to the network nodes. The IAB node 104 can indicate its relaying capability in at least one of the phase 1 and the phase 2.

In case, in the phase 1, if the IAB node 104 does not indicate its relaying capability, then, the IAB node 104 (acting as the UE) only performs a cell selection on any one of the available cells meeting S-criteria in a corresponding region in the phase 1. The MT 104b of the IAB node 104 establishes an RRC connection with the selected cell/other IAB node 104 and sends an attach request/RRC message to the other IAB node 104/RAN node (cell). The other/active IAB node 104 (referred herein after as a gNB) to which the cell belong selects an AMF and sends an attach message (can be encapsulated in an RRC message) to the selected AMF in order to complete the attach procedure. Since the gNB is not aware that the IAB node 104 (acting as the UE) is capable of the relay functionality, the gNB cannot select the AMF entity that supports the relaying functionalities. Further, the gNB treats the IAB node 104 (acting as the UE) as any other UE. The AMF initiates the authentication procedure and the AUSF and UDM performs the authentication of the IAB node 104 (acting as the UE) (using standard UE authentication procedures). During the authentication, based on the subscription data of the IAB node 104 (acting as the UE), the AUSF and the UDM become aware that the IAB node 104 (acting as the UE) has the relaying capability/IAB capability. However, the AMF and the gNB may be still unaware about the relaying capabilities of the IAB node 104 (acting as the UE), Thus, the MT 104b of the IAB node 104 which is attached to the 5G standalone network 100a for receiving the pre-configurations is not authenticated as an IAB capable device/relay node in the phase 1. In certain deployments where all AMFs have the same capability, it is not needed for the AMF to be aware that the IAB node 104 (attached as the UE) is part of an IAB node or not. Thus, the IAB node 104 (acting as the UE) is only authenticated as the normal UE in the phase 1 and the AMF is not aware that the IAB node 104 (attached as the UE) possesses IAB capability. Also, since pre-configurations are not available at the IAB node 104 during the phase 1, there may be a possibility that the MT 104b of the IAB node 104 was camped on the gNB without having the functionalities of the IAB donor 106. Thus, whenever the IAB node 104 does not indicate the relay capability to network nodes (including gNB, AMF, AUSF, UDM and so on) in the phase 1, the IAB node 104 is required to indicate the relay capability as a part of the operation of the phase 2.

In an embodiment, in the phase 2 of the startup procedure, the IAB node 104 (attached as the UE) performs the cell selection to select at least one of the allowed IAB donor 106 (DgNB) and the cell that belongs to the other IAB node 104 which has the connectivity to the allowed IAB donor 106. Based on the successful cell selection, the IAB node 104 (attached as the UE) sends an attach request/RRC connection request indicating the relaying capability to the selected at least one of the allowed IAB donor 106 (DgNB) and the cell that belongs to the other IAB node 104 which has the connectivity to the allowed IAB donor 106. The selected at least one of the allowed IAB donor 106 (DgNB) and the cell that belongs to the other IAB node 104 which has the connectivity to the allowed IAB donor 106 can be connected to one or multiple AMFs that form an AMF pool and are aware of the AMFs that support operation of the IAB node 104. Therefore, it can be ensured that AMF selection results in selecting an AMF entity/function that supports operation of the IAB nodes. Once the attach request of the IAB node 104 (attached as the UE) initiated in the phase 2 is received by the concerned AMF, the AMF authenticates that the IAB node 104 (attached as the UE) has the required permissions and subscription to operate as the relay node/IAB node. After the successful authentication of the relaying capability of the IAB node 104, the IAB node 104 initiates the network interface setup and then activates the DU 104a (the RAN part) of the IAB node 104.

In an embodiment, the IAB node 104 can indicate its relaying capability to the entities of the network functions of the NGC 201 while performing the operations of the phase 1. In other modes of reception of the pre-configurations (except for the mode of predefined pre-configurations being stored on the IAB node 104), the IAB node 104 (acting as the UE) does not have any knowledge of the allowed IAB donor 106. As a result, the cell selection performed by the MT 104b of the IAB node 104 during the phase 1 of the startup procedure does not guarantee the IAB node 104 (acting as the UE) about the connectivity to the allowed IAB donor 106. Further, the serving cell may belong to the other/active IAB node (the gNB) that does not connect to network nodes (the gNB and the AMF) that can support IAB node operation. However, if the cell selection results in the MT 104a of the IAB node 104 selecting the cell that has connectivity to the IAB donor (DgNB) 106, then it may be beneficial for the IAB node 104 to indicate its relaying capability in the phase 1 itself. Thus, indicating the relay capability by the IAB node 104 in the phase 1 can reduce overall latency and time taken for completion of the startup procedure. Further, the selected IAB donor 106 may perform an AMF selection to select the AMF, wherein the selected AMF by the IAB donor 106 can ensure that the selected AMF has capability to support and authenticate the IAB node 104 during the phase 1 of the startup procedure.

Further, the cell selection performed by the MT 104*b* of the IAB node 104 during the phase 1 of the startup procedure results in a selection of the cell that belongs to the other IAB node 104 (the gNB) that does not support operation of the IAB nodes 104. In such cases, all gNBs should be made aware of the neighbor gNB capabilities related to support of the IAB node operation in the neighbor gNBs (i.e. whether the neighbor gNB can function as a DgNB/IAB donor). In such cases, the 5G standalone network 100*a* can provide assistance to the IAB node 104 (acting as the UE). The assistance can comprise of assisting the UE mobility towards the gNB on being aware that the IAB node 104 (acting as the UE) can act as the relay node. The assistance may be provided to the IAB node 104 (acting as the UE) in a form of connected state or idle state mobility parameters. The 5G standalone network 100*a* may either provide a redirection command or provide dedicated cell reselection priorities to the IAB node 104 (acting as the UE) while providing the assistance.

There can also be a case where a handover command can be provided to the IAB node 104 (acting as the UE) prior to establishing UE security specifically for the case where the IAB node 104 (acting as the UE) attempting to connect to the network is the relay node/TAB node. These procedures may ensure that the IAB node 104 (acting as the UE) performs phase 1 or procedure 1 attach over the gNB and the AMF that has capability to support the IAB nodes connected to them. Thus, the network nodes may aware that the IAB node 104 attempting to connect to the network 100*a* as the UE is capable of operating as the relay node at a time of reception of the attach message by the AMF for authenticating the relaying capability of the TAB node 104. Once the authentication of the IAB node 104 as the relay node is successfully completed, the pre-configurations can be delivered by the OAM server to the OAM client embedded in the TAB node 104 via the MT 104*b* of the IAB node 104. Further, the PDU session for delivery of the pre-configurations to the IAB node 104 may be established based on whether the pre-configurations are delivered as IP packets or non-IP packets. In such cases, there is no need for the TAB node 104 to detach from the network 104*b* as the IAB node 104 is already authenticated as the relay node/TAB node at the completion of operations of the phase 1 of the startup procedure. Only the RRC connection can be released so that the IAB node 104 can perform re-selection of the at least one of the IAB donor 106 (DgNB) and the other IAB nodes connected with the TAB donor 106 for better QoS based on the assistance received during the pre-configurations.

In an embodiment, the IAB node 104 (attached as the UE) can indicate its relaying capability to the network nodes by sending an attach message in a form of a NAS message to the network nodes. The IAB node 104 can send the NAS message by including a relay capability indicator in the NAS message. The relay capability indicator indicates the relaying capability of the IAB node 104. The IAB node 104 can indicate its relaying capability in either the phase 1 or the phase 2. Since the relay capability indicator is a part of the NAS message, the IAB donor 106 (the DgNB) does not know whether the RRC connected UE (the IAB node (attached as the UE)) is the IAB capable. Therefore, the IAB donor 106 assumes that the IAB node (attached as the UE) is the normal UE in the network 100*a* and not the IAB node. In an embodiment herein, the gNB may receive assistance information from the AMF in order to facilitate the connection to the AMF that supports relaying functionality. The network nodes selection and routing path for the attach message can be optimized further, if the relaying capability is indicated in the RRC message sent by the IAB node 104 (acting as the UE) to the network nodes.

In an embodiment, the IAB node 104 (attached as the UE) can indicate its relaying capability to the network nodes by sending an attach message in a form of an Access Stratum (AS) message to the network nodes. In an example herein, the IAB node 104 (attached as the UE) can send the relay capability indication to the network nodes in an RRC message (the AS message) in order to indicate that the IAB node 104 (attached as the UE) attempting to establish the connection and perform the attach registration to the network 100*a* is the relay node. The IAB node 104 can send the RRC message including the relay capability indicator in either the phase 1 or the phase 2 of the startup procedure.

Further, the IAB node 104 (attached as the UE) can send the relay capability indicator to the network nodes as a part of at least one of the RRC message and a random access preamble. If the relay capability indicator is a part of the RRC message, then the RRC message can either be part of an RRC connection request (MSG3) or can be part of a RRC connection setup complete message (MSG5). Thus, the gNB may be aware that the IAB node 104 (attached as the UE) is IAB capable, prior to performing the AMF selection to send the encapsulated NAS Message (Attach request) to the AMF. Once the IAB donor 106 is aware that the IAB node 104 (attached as the UE) is the IAB node capable of performing the relaying functionalities, the IAB donor 106 performs the AMF selection only among the AMFs known by the IAB donor 106, which can support the IAB operations. Once AMF receives the RRC message, the AMF can directly initiate authentication of the relaying capability of the IAB node 104.

If the relay capability indicator is a part of the random access preamble/procedure, then the IAB donor 106 (the DgNB) needs to be made aware of the relaying capability of the IAB node 104 during a message 1 preamble transmission itself. In an embodiment, the IAB donor 106 may recognize that the IAB node 104 (attached as the UE) is the IAB node having the relaying capability based on at least one of a fixed preamble ID and a set of preamble IDs reserved for use only by the IAB node 104. The fixed preamble ID and the set of preamble IDs can be reserved by reserving a preamble group for the IAB nodes 104.

In an embodiment, the IAB donor 106 may recognize that the IAB node 104 (attached as the UE) is the IAB node having the relaying capability based on a preamble format defined specific to the IAB nodes 104. Thus, as soon as the IAB donor 106 detects the preamble, the IAB donor 106 determines that the connection establishment request is being sent by the IAB node 104 and not a normal UE.

In an embodiment, the IAB donor 106 may recognize that the IAB node 106 (attached as the UE) is the IAB node having the relaying capability based on Physical Random Access Channel (PRACH) resources configured specific for use by the IAB nodes 104. In such a case, the PRACH resource utilization may be much lesser than that of a regular PRACH. Further, the random access parameters (such as the preamble format, the preamble IDs, the PRACH resources or the like) for the IAB node capability indication may be configured as a part of required minimum system information (RMSI).

In an embodiment, the IAB node 104 can indicate its relaying capability in a UE capability message. In the network 100*a*, where all the AMFs are having the same capability or when the NGC and the AMF do not need to be aware that the IAB node 104 (attached as the UE) is the IAB node having the relaying capability and only the IAB donors 106 (the RAN nodes) need to be aware that the IAB node 104 attempting for the RRC connection is the IAB node having the relaying capability, then the IAB node 104 can send the IAB capability indication as a part of the UE capability message. The IAB capability indication may be a 1 bit information in the UE capability message. A UE capability container including the UE capability message may be sent by the IAB node 104 on receiving a capability enquiry request from the network 100a. An example UE capability message indicating the IAB capability is as illustrated below:

UEcapabilityInformationNR{

. . .

IAB indication (True)

. . .

}

Once the IAB node 104 is authenticated as the relay node by showing its relay capability to the network nodes, the IAB node 104 uses the pre-configurations received from the OAM server (in the phase 1) to select the cell to camp in order to complete additional operations of the startup procedure and begin functioning as a forwarding/relaying entity in the phase 2. In the network 100a, not all the IAB nodes 104 (the gNBs) may be capable of providing services, (such as, adapt configurations, multi hop transmissions, bearer termination, handling changes among other requirements and so on) to the JAB node 104. Therefore, the JAB node 104 performs the cell selection to learn about the different JAB nodes 104 and JAB donors 106 that are available in the area to which the JAB node 104 can establish connection, complete startup procedure and start operating as the relaying JAB node.

In an embodiment, the JAB node 104 identifies and performs the cell selection based on information of the JAB donor 106. The JAB node 104 may receive the pre-configurations from the OAM server (during the phase 1 of the startup procedure) including a list of JAB donors 106. The JAB node 104 (attached as the UE) which is present in the direct coverage area of any of the JAB donors 106 present in the list of the JAB donors 106 (which is provided in the pre-configurations) can perform the cell selection on the other JAB node (the gNB) if the ID of the gNB matches with the one of the JAB donors 106 present in the list of JAB donors 106. The cell selection can be successful only if the JAB node 104 (attached as the UE) is present in the direct coverage area of the JAB donor 106 whose ID matches with the ID of the gNB.

If the JAB node 104 (attached as the UE) is not present in the direct coverage area of the JAB donor 106, the JAB node 104 (attached as the UE) can connect with another JAB node (the gNB) to connect with the JAB donor 106. Therefore, the JAB node 104 (attached as the UE) may identify another active JAB node that is connected to the JAB donor 106 (referred hereinafter as a parent JAB node). The JAB node 104 (attached as the UE) identifies the parent JAB node based on the ID of the IAB donor 106 broadcasted by the parent IAB node. The parent IAB node broadcasts the ID of the IAB donor 106 (received in the pre-configurations using which the parent TAB node is in direct coverage of the IAB donor 106) in a broadcast message (can be PBCH MIB, SIBs and so on). The parent IAB node adds the ID of the IAB donor 106 in its system information. The ID of the IAB donor 106 can be at least one of a NR cell global identifier, a combination of a cell global identifier (CGI/nCGI) and a physical cell ID (PCI), the CGI/nCGI, the PCI and so on. The ID of the donor JAB 106 may be broadcasted by the JAB donor 106 in its system information. Using the ID of the IAB donor 106 and the ID of the parent IAB node, the IAB node 104 may even configure a frequency over which each IAB donor 106 is present and a public land mobile network (PLMN) on which these IAB donors 106 can operate.

In an embodiment, the IAB node 104 identifies and performs the cell selection based on information related to the other/active IAB nodes 104 present in the standalone network 100a. The IAB node 104 (attached as the UE) may receive the pre-configurations from the OAM server (during the phase 1 of the startup procedure) including the list of IAB donors 106 and a list of IAB nodes that are currently active in the 5G standalone network 100a. Thus, the MT 104b of the IAB node 104 performing the cell selection may aware of at least one of the active IAB nodes 104 and the IAB donors 106 to which the MT 104b can camp on. The IAB node 104 (attached as the UE) which is in coverage of the other IAB nodes 104 (present in the list of IAB nodes of the pre-configurations) can perform the cell selection on the other IAB node (the gNB) if the ID of the gNB matches with any one of the other IAB nodes received during the pre-configurations. However, the IAB nodes 104 may enter or leave the 5G standalone network 100b at any time based on certain events. Therefore, it may not possible to maintain a static list of active IAB nodes in the pre-configurations. The list of active IAB nodes in the pre-configurations can be updated when the IAB node 104 has completed the startup procedure. Prior to operating as the relay node, the IAB node 104 may be configured with cell identifiers such as a unique cell global identifier (CGI or nCGI) and a non-interfering PCI. The cell identifiers can be used by the IAB node 104 for operating as the RAN node in order to facilitate the UEs 102 and/or the other IAB nodes 104 to camp on it and avail service. The IAB node 104 can receive the cell identifiers as a part of the pre-configurations. While allocating the cell identifiers to the IAB node 104, the OAM server can also update the pre-configurations to add the IAB nodes 104 in the list of the IAB nodes of the pre-configurations to facilitate indirection IAB node connectivity to the IAB donor 106.

Further, the other IAB node (the parent IAB node) may broadcast its ID in its system information in order to allow the other IAB nodes to identify its connectivity to the IAB donor 106. The ID of the other IAB node 104 can be at least one of a NR cell global identifier, a combination of both the CGI/nCGI and the PCI. The other IAB node is allocated with the ID by the OAM server during a time of its startup. In an embodiment herein, along with the ID of the other IAB nodes, the OMA server may configure the frequency over which each IAB node is present and the PLMN on which these IAB nodes can operate.

In an embodiment, the IAB node 104 (attached as the UE) can select the at least one of the other IAB node 104 and the IAB donor 106 as a best candidate based on the assistance information received from the OAM server. In the phase 2, in order to establish connectivity with the IAB donor 106, the IAB node performs a normal idle mode cell selection and a PLMN selection procedure. Once the IAB node 104 (attached as the UE) capable of providing the relaying functionality selects the cell and establishes connection, the IAB node 104 is expected to be in an RRC connected state in order to provide seamless service to the connected UEs 102.

The IAB node 104 can transit to an idle state only when at least one pre-defined error (Radio link failure to parent node, out of service and so on) occurs. The IAB node 104 can transit to the IDLE state when there are no UEs connected to the IAB node 104. Therefore, it may beneficial for the IAB node 104, if the IAB node 104 establishes the RRC connection request while selecting the at least one of the other IAB node 104 and the IAB donor 106. Due to this, the IAB node 104 may select the best cell available in the area since the IAB node 104 cannot reselect a better cell later (since the IAB node 104 is expected to be in connected state for a long time unless network initiates a cell change).

In an embodiment, the IAB node 104 may use additional information along with the normal cell selection parameters to select the best available/possible cell (the other IAB node 104 having connectivity to the IAB donor 106/the IAB donor 106). The normal cell selection parameters can be, but not limited to, Cell selection minimum reception (RX) level value (Qrxlevmin), access band information, Public Land Mobile Network (PLMN) information and so on. The additional information can be, but not limited to, System Information Blocks (SIBs), information elements that are required to perform cell reselection and so on. The IAB node 104 (attached as the UE) can select a first available cell that has connectivity to the IAB node 106. Once the cell selection is completed, the IAB node 104 may acquire the SIBs that are needed for the cell reselection (prior to initiating the phase 2 of the startup procedure) from at least one of the other DU IAB nodes 104 and the IAB donor 106. Once the SIBs are received, the IAB node 104 acquires the information elements (such as, but not limited to, Qrxlevmin, access band information, PLMN information and so on) that are needed to perform the cell reselection. Further, the IAB node 104 uses the SIBs and the information elements to perform the cell reselection to select the best available cell (the other IAB node 104 having connectivity to the IAB donor 106/the IAB donor 106).

In an embodiment, in the phase 2, on receiving the pre-configurations, the JAB node 104 (attached as the UE) can select the first available cell that has connectivity to the JAB donor 106 and perform transition to an idle at an end of the phase 2. On transition to the idle state, the JAB node 104 acquires the SIBs that are needed for the cell reselection and performs the cell reselection evaluation and reselection to reselect the best available cell (the other JAB node 104 having connectivity to the JAB donor 106/the JAB donor 106).

The JAB node 104 can perform the cell reselection evaluation in a time period, which is limited/defined by at least one of a timer and an event. In an example herein, the time period may be controlled using a new RRC time (for example, a T3xy). The T3xy can be started when the SIB acquisition for a neighbor evaluation is received or requested. On an expiry of the T3xy, the JAB node 104 (attached as the UE) considers the current serving cell as the best available cell and continues further procedures on the selected best available cell. The T3xy can be stopped when the neighbor cell has met higher priority reselection criteria. In an example herein, the time period for performing the reselection evaluation can be controlled by limiting an evaluation to a single neighbor detection cycle. On an expiry of the neighbor detection cycle, the IAB node 104 (attached as the UE) considers the current serving cell as the best available cell and proceeds with further procedures on the selected best available cell.

Further, in the 5G standalone network 100a, one or more neighbor nodes (the JAB nodes) may directly connected to the JAB donor 106 and one or more JAB nodes may be connected indirectly to the JAB donor 106. Further, one or more JAB nodes 104 can also be connected to the JAB donor 106 with a higher number of hops than other JAB nodes. In such a scenario, the JAB node 104 can connect to the JAB donor 106 via a path with minimal hops using measurements. The measurements can be measurements of a radio link between the JAB donor 104 (attached as the UE) attempting startup and the other JAB node. Further, the JAB node 104 can perform the cell reselection or the cell reselection evaluation based on the hop count, wherein smaller the hop count, the better is the cell evaluation. The cell reselection can be controlled over another threshold of measurements that needs to be satisfied. For example, a node with lesser hops may not be the best available node, if the radio link to that node is very weak. Thus, a threshold value for the radio link quality and signal strength can be considered along with the hop count by the IAB node 104 for selecting the best available cell. The hop count/configurations of number of hops and the measurement evaluation can be carried over a cell broadcast such as RMSI or the like.

In an embodiment, the pre-configurations received by the IAB node 104 (attached as the UE) during the phase 1 may also limit the selection of the parent node/other IAB node based on the hop count that needs to be get connected with the IAB donor 106. In an embodiment, the MT 104b of the IAB node 104 can be indicated with a maximum number of hops that the IAB node 104 is allowed to use to connect with the IAB donor 106. If the IAB node 104 (attached as the UE) detects that the other IAB node has used the maximum hops during the cell selection, the IAB node 104 may not select that other IAB node for the cell selection. In an embodiment, the other IAB node 104 determines the allowed maximum number of hops and does not broadcast the support of the IAB operation for the IAB node 104 to connect to if the other IAB node 104 has used the maximum number of hops. In an embodiment, the OAM server may be updated with a routing path from the IAB donor 106 to each IAB node and if the number of hops reaches the maximum allowed hop count, the OAM server may not add the IAB nodes (with maximum hop count) in the pre-configurations that needs to be send to the IAB node 104.

In an embodiment, the IAB node 104 (attached as the UE) can perform the cell selection based on the latency supported by the IAB node 104. Consider an example scenario, where the cell with a path comprising of longer hops to the IAB donor 106 has a lesser number of UEs connected or lesser traffic being routed. In such cases, the IAB node 104 may select the best available cell, which supports the minimal latency. The IAB nodes 104 can broadcast the list of services that can be supported since it may not feasible for the IAB node 104 to broadcast the latency. For example, the IAB node 104 may broadcast whether the IAB node 104 can support Ultra-Reliable Low-Latency Communication (URLLC) services on the cell. The IAB node 104 (attached as the UE) that supports the URLLC services can prioritize to camp on the other IAB node that supports the URLLC service even if the number of hops is more or the measurement is weak.

After performing the cell selection using the pre-configurations received from the OAM server, the IAB node 104 attaches with the NGC by indicating the IAB capability/relay capability for the UE (the operation can be performed in either the phase 1 or the phase 2 of the startup procedure). Thus, facilitating the AMF and the AUSF of the NGC to authenticate the IAB node 104 (attached as the UE) for the IAB operation/relaying functionality. Once the successful authentication of the IAB node 104 is performed and is allowed to support IAB operation on the selected network, the IAB node 104 can establish the network interface/F1* connectivity in order to provide forwarding and relaying path for the control and user plane traffic.

In the 5G standalone network 100a as illustrated in FIGS. 2a and 2b, the IAB node 104 (authorized as the relay node) includes only the DU 104a (including the PHY layer, the MAC layer and the RLC layer of the NR protocol stack). The DU 104a of the IAB node 104 needs to be connected with the CU 106b of the IAB donor 106 by establishing the F1/F1* network interface (as illustrated in FIG. 2f). Further, in the standalone network 100a as illustrated in FIGS. 2a and 2b, the radio bearer over which the F1/F1* network interface related messages are carried may terminate at a correct PDCP entity at the CU 106b of the IAB donor 106, since the F1/F1* network interface related message are carried over the NR backhaul air interface (Un interface) unlike a regular F1 message. Therefore, the RLC at the DU 106a of the IAB donor 106 may differentiate the F1/F1* network interface related messages from other traffic/messages. Additionally, the RLC at the DU 106a of the IAB donor 106 may differentiate between F1-U/F1*-U network interface related message (user plane messages) and F1-C/F1*-C network interfaces related messages (control plane messages). Thus, the adapt layer can be configured at the DU 104a of the IAB node 104 and may be placed above the RLC at the DU 104a of the IAB node 104 for mapping the F1/F1* network interface related messages over the radio bearer. The adapt layer configured at the DU 104a of the IAB node 104 and placed above the RLC at the DU 104a of the IAB node 104 is illustrated in FIGS. 2g and 2h.

In an embodiment, the IAB node 104 (authenticated as the relay node) initiates a F1 setup procedure which is needed to exchange application level data needed for the DU 104a of the IAB node 104 and the CU 106b of the IAB donor 106 to correctly interoperate on the F1/F1* network interface. The F1/F1* network interface is setup between the DU 104a of the IAB node 104 and the CU 106b of the IAB donor 106 and may be connected via the NR backhaul air interface over multiple hops. Therefore, the F1/F1* network interface for control plane and user plane are carried over the radio bearers. The F1/F1* network interface (F1-U/F1*-U and F1-C/F1*-C network interfaces) carried over air interface via the radio bearers is illustrated in FIG. 2f. Further, there may be one F1/F1* network interface relation between the DU 104a of the IAB node 104 and the CU 106b of the IAB donor 106. Further, a GTP tunnel is established to carry the user plane traffic over the F1 user plane interface (F1-U/F1*-U). Since the PDCP entity is present on the CU 106b, the F1-U/F1*-U network interface carries the user plane data from RLC of the DU 104a of the IAB node 104 to the PDCP on the CU 106b of the IAB donor 106 and vice versa. The PDCP may then be mapped onto a Service Data Adaptation Protocol (SDAP) and later to a Next Generation (NG) interface for carrying the user traffic to the associated UPF of the NGC. Therefore, a General Packet Radio Services (GPRS) Tunneling Protocol (GTP tunnel) for each data radio bearer per UE can be used in order to identify each DRB separately at the PDCP at the CU 106b of the IAB donor 106. An example protocol stack architecture for the F1-U/F1*-U network interface established between the IAB node 104 and the connected IAB donor 106 is illustrated in FIG. 2g.

The F1/F1* network interface is also used to carry control messages that can be terminated at the RRC residing at the CU 106b of the IAB donor 106. The F1/F1* network interface is also used to carry NAS messages to the AMF of the NGC 201. In such cases, the F1-C/F1*-C network interface can be setup by the IAB node 104 towards RRC for routing control plane traffic and introducing differential routing for user plane and control plane traffic. The F1-C/F1*-C network interface can be established between the DU 104a of the IAB node 104 and the PDCP at the CU 106b of the IAB donor 106. Further, Stream Control Transmission Protocol (SCTP) tunnels can be established for each UE for carrying the control plane traffic to the CU 106b of the IAB donor 106. An example protocol stack architecture for the F1-C/F1*-C network interface established between the IAB node 104 and the connected IAB donor 106 is illustrated in FIG. 2h.

After establishing the F1/F1* network interface by the IAB node 104 with the connected IAB donor 106, in the phase 3, the IAB node 104 (attached as the relay node) establishes the PDN session to provide the IP connectivity to the connected UE(s) 102 to connect to the external data network.

In the 5G standalone network 100a as illustrated in FIG. 2a, the PDU session can be established towards the UPF(s) to which the IAB donor 104 can have the NG connection/interface established. After the successful authentication for operation as the IAB node 104 is completed, the IAB node 104 initiates a PDU establishment request for required services or default service. There may be a single PDU session established for each type of QoS or service the IAB donor 104 may support. Each PDU session is between the MT 104b of the IAB node 104 and the UPF to which the IAB donor 106 has NG setup (UPF to which the data network is connected to).

In the 5G standalone network 100a as illustrated in FIG. 2b, the PDU session can be established towards the UPF 106c (the local UPF) embedded with the CU 106b of the IAB donor 106. After the authentication for operation as the IAB node is successfully completed, the IAB node 104 initiates a PDU establishment request for required services or default service. There may be a single PDU session established for each type of QoS or service the IAB donor 104 may support. Each PDU session can be between the MT 104b of the IAB node 104 and the UPF present at the IAB donor 106. On the intermediate IAB nodes, the PDU sessions can be mapped to the radio bearer or logical channels configured for the intermediate IAB nodes.

In an embodiment, the IAB node 104 can establish only a default PDU session initially and establish other PDU sessions on a demand basis based on at least one of the connected UEs 102 and the other IAB nodes 104 by requesting the IAB node 104 for the other PDN sessions. After setting up the DU 104a and the network interface F1*, the IAB node 104 initiates the PDU establishment request for the establishment of the default PDU session with the NGC 201. On initiating the PDU establishment request by the IAB node 104, the AMF of the NGC selects the SMF that can manage the PDU sessions. The SMF in turn selects the appropriate UPF network function that can provide the IP connectivity to the data network being requested. The PDU session may carry multiple IP flows and each of the IP flow may be associated to an independent QoS. The QoS based IP flows on the NGC 201 may be mapped on to the DRB on the DU 104a of the IAB node 104. In an embodiment, the default PDU session can be established irrespective of at least one of different data networks, the IAB node that is capable to route the traffic to other nodes and so on. The QoS based IP flows carried by the default PDU session can be mapped on to the single DRB that is established between the IAB node 104 and the parent node. The parent node herein refers to at least one of the other IAB node and the IAB donor 106. The IAB node 104 can initiate the establishment of the other PDU sessions based on a request received from the connected UE 102 for the PDU session that is not established. Further, the IAB node 104 can configure the additional DRBs on the same PDU session (the default PDU session), when QoS requirement for a new IP flow to any UE is different from the QoS requirement of the IP flow that is already established between the MT 104b of the IAB node 104 and the parent node.

In an embodiment, once the network interface setup and activation of the DU 104a is completed, the IAB node 104 can initiate the PDU establishment request for establishment of multiple PDU sessions. On initiating the PDU establishment request by the IAB node 104, the AMF of the NGC selects the SMF that can manage the multiple PDU sessions. The SMF in turn selects the appropriate UPF network function that can provide the IP connectivity to the data network being requested. The multiple PDU sessions can be established with the NGC during the startup procedure. The PDU sessions may carry multiple IP flows and each of the IP flow is associated to an independent QoS. The QoS based IP flows on the NGC are mapped on to Data Radio Bearer (DRB) on the DU 104a of the IAB node 104. Along with the established multiple PDU sessions, there may be one PDU session (the default PDU session) towards all the data network to which the IAB node 104 can communicate to, irrespective of whether the connected UE requires that service anytime. The IAB node 104 may not be aware whether the connected UE would require service until the UEs 102 are allowed to connect to the IAB node 104 only after the IP connectivity and all other procedures of the startup are completed. Thus, the IAB node 104 may configure all the possible DRBs between the IAB node and the connected parent node. In an example herein, the IAB node 104 can be configured with 16 DRBs supported in the NR during the establishment of the PDU sessions. The DRBs configured during the establishment of the PDU sessions can be the DRBs that are pre-configured on the IAB node 104 prior to the IAB node 104 acting as the relay node. Since the PDU sessions DRBs are pre-configured on the IAB node 104, the IAB node 104 can provide the IP connectivity for any connected UEs to the required external data network with very less latency. Since, the IAB node 104 is pre-configured with the PDU sessions DRBs, the IAB node 104 may not be required to establish a complete IP path for each UE as and when the UE requires the PDU session establishment to the external data network.

Further, the IAB node 104 can initiate a PDU session disconnect request, if there are no UEs requesting the service on the PDU sessions. However, the IAB node 104 always maintain at least one of the PDU session, the IP connectivity and the non-IP connectivity towards the OAM server in order to exchange the OAM related updates with the OAM server. Each IAB node 104 sends alarms and traffic counter information to the OAM server, from which the IAB node receives commands, configuration data and software upgrades. The OAM traffic is transported over the Un or NR backhaul air interface, and the IAB node 104 shares resources with the rest of the traffic, including the UEs 102 attached to the parent node. The packets related to OAM traffic can be mapped to the radio bearers like a normal user traffic (based on IP or non-IP connectivity to the OAM). Since the packets related to the OAM traffic may traverse over multiple hops based on the IAB node 104 that triggers the message or the IAB node for which the message is intended, the adapt layer can ensure that the packets between each hop are mapped on to the correct radio bearer or logical channel.

In an embodiment, in the phase 3, the adapt layer can be configured by the OAM server with a packet to the radio bearer or the logical channel (the F1* network interface) mapping rules that are required to carry uplink traffic from the MT 104b of the IAB node 104 (or the other IAB node) towards the next hop and eventually to the IAB donor 106. In an embodiment, the adapt layer can also be configured with the packet/PDUs to the radio bearers or logic channel mapping rules required to carry and forward downlink traffic from the IAB donor 106 to the DU 106a of the other IAB node 106a and eventually to the MT 104b of the IAB node 104 where the packet is expected to terminate.

The adapt layer may be configured by the OAM server with configurations required for the following:
  mapping of the IAB node initiated (UL) or terminating (DL) RRC control plane traffic to the appropriate radio bearer or logical channel;
  mapping of the IAB node initiated (UL) or terminating (DL) NAS control plane traffic to the appropriate radio bearer or logical channel;
  mapping of the IAB node initiated (UL) or terminating (DL) user plane traffic or OAM traffic to the appropriate radio bearer or logical channel;
  mapping of the UE initiated (UL) or terminating (DL) RRC control plane traffic to the appropriate radio bearer or logical channel;
  mapping of the UE initiated (UL) or terminating (DL) NAS control plane traffic to the appropriate radio bearer or logical channel;
  mapping of the UE initiated (UL) or terminating (DL) user plane traffic to the appropriate radio bearer or logical channel;
  mapping the QoS requirement and a PDU session configuration for each traffic type (the RRC control plane traffic, the NAS control plane traffic, the user plane traffic/OAM traffic and so on); and
  mapping rules of the radio bearer/logical channel to appropriate 5QI values (wherever applicable).

Further, in the phase 3, once the PDU session is established towards the external data network, the IAB node 104 can forward the user plane and control plane traffic generated by at least one of the connected UE 102 and the serving/other IAB nodes 104 to the external data network. The IAB node 104 can forward the user plane and control plane traffic using the F1/F1* network interface over one or multiple NR backhaul air interface (Un interface) based on the number of hops between the DU 104a of the IAB node 104 and the CU 106b of the IAB donor 106. Since the F1/F1* network interface (hereinafter referred to as the F1/F1*messages) are carried over the air interface unlike the regular F1 message, the F1/F1*messages can be mapped to the radio bearer. The F1-U/F1*-U messages (the F1-U/F1*-U network interface) which are user plane traffic already have a QoS linked PDU session and DRB configured and provisioned which can be used for routing the packets further. However, there may be F1-C/F1*-C packets (the F1-U/F1*-U network interface) on the control plane as well which are RRC or NAS initiated messages and are not associated to the QoS or the PDU session on the air interface. Such F1-C/F1*-C packets normally linked to the SRB between the UE and the IAB node 104. Thus, the F1-C/F1*-C packets can be carried over the radio bearers.

In an embodiment, the IAB node 104 transfers and forwards the F1-C/F1*-C packets (the control plane traffic received from at least one of the connected UE 102 and the connected IAB node 104) on the control plane over an existing SRB. In order to correctly route the F1-C/F1*-C packets from the IAB node 104 to the IAB donor 106, the SRBs can be configured at the MT 104b of the IAB node 104. The SRBs can be configured at the MT 104*b*, since the SRBs are absent at the MT 104*b* of the IAB node 104. In addition, separate SRBs can be configured for RRC traffic which terminates at the CU itself (for example; aSRB1), and for NAS traffic which terminates at AMF (for example; a SRB2). The MT 104*b* of the IAB node 104 can handle the SRBs by having separate logical channels at the RLC entities that are dedicated to carrying the SRB1 and SRB2 messages to the CU 106*b* of the IAB donor 106. The mapping of the SRB related data arriving from the DU 104*a* to the MT 104*b* of the IAB node 104 can be performed at adapt layer. The mapping shall be such that the DU 106*a* of the IAB donor 106 can identify that the data/messages received over the logical channels or SRB bearers are control plane messages so that they can be carried over the F1-C/F1*-C network interface to terminate at the appropriate entity. The SRB1 and the SRB2 related messages destined to and from the IAB node 104 can be carried other same or over the different RLC channel. For example, if a specific logical channel and signaling radio bearer is dedicated to carrying the SRB1 related messages, then another logical channel and signaling radio bearer can be dedicated to carry the SRB2 related messages across all the IAB nodes 104 connected to the IAB donor 106.

In an embodiment, the IAB node 104 transfers and forwards the F1-C/F1*-C packets on the control plane (the F1*C control plane traffic) over an existing DRB. The SRB related messages can be mapped on to the DRBs that are available at the MT 104*b* of the IAB node 104. In an embodiment, the IAB node 104 can configure and reserve the DRB or the logical channel for carrying the SRB related traffic from the MT 104*b* of the IAB node 104 to the IAB donor 106 in an uplink and to the connected UE in a downlink. The adapt layer associated with the IAB node 104 can perform a mapping of the SRB messages (the F1-C/F1*-C packets) on to a single DRB (Common DRB for RRC-SRB1 and NAS-SRB2 messages) or to two separate DRBs (1 DRB for RRC-SRB1 and other for NAS-SRB2 messages). The DRB carries the user plane traffic that is passed on to the PDCP of the CU 106*b* of the IAB donor 106 as a data packet to be routed to the SDAP layer and eventually to the connected UPF based on the PDU session the DRB is configured for. Also, each DRB is associated to the PDU session as per current provisions in the 3GPP specification. However, being SRB messages carrying control plane traffic, the termination of SRB messages (the F1-C/F1*-C packets) need to be either at RRC at the IAB donor 106 (the DgNB) or at the AMF. Therefore, the DRBs or logical channels over which the SRB traffic (the F1-C/F1*-C packets) forwarding is configured can be dedicatedly configured to carry only SRB traffic from multiple F1*-C interfaces (from multiple IAB nodes or UEs whose CP messages are to be relayed or forwarded). This configuration can be uniform across all the adapt layers on each IAB node 104. This can ensure that the DU 106*a* of at the DgNB 106 sends the SRB messages (the F1-C/F1*-C packets) to the CU PDCP at the DgNB 106 over the F1*-C/F1-C interface and not the F1*-U/F1-U interface and is done for other DRBs. As a result, it may require that the adapt layer is to be placed at the DU 106*a* of the DgNB 106. Alternatively, a mapping configuration or a procedure can be defined at the DU 106*a* of the DgNB 106.

In an embodiment, the IAB node 104 transfers and forwards the F1-C/F1*-C packets on the control plane over a new SRB. The new SRB may either be a single SRB for multiplexing both RRC-SRB1 and NAS-SRB2 messages on the same new SRB or may be 2 separate SRBs, one for carrying RRC-SRB1 and other for carrying NAS-SRB2 messages. The UE 102 and the DgNB 106 can initiate the transmission over the existing SRB1 and SRB2. Thus, the adapt layer at the IAB node 104 can perform a mapping of the F1-C/F1*-C packets on to the new SRB(s).

Further, the new SRB or the associated logical channel can have a node to node connectivity between the IAB node 104 and its parent node 104/106. The DU 104*a*/106*a* of the parent node 104/106 identifies that the F1-C/F1*-C packets are received over RLC or SRB or logical channel that is configured specifically to carry the SRB traffic (over the new SRB). Accordingly, the DU 104*a*/106*a* of the parent node 104/106 instructs appropriately the adapt layer on the MT 104*b* of the IAB node 104 to map the F1-C/F1*-C packets to similar SRB/logical channel/RLC entity for the next hop. Thus, at each hop, the F1-C/F1*-C packets can be treated as SRB traffic and can be handled with a priority during scheduling based on the MAC Logical channel prioritization (LCP) and scheduling parameters which are tailored for SRB traffic. The CU 106*b* on the IAB Donor 106 can also be aware that the F1-C/F1*-C packets received on the new SRB or logical channel or RLC are for the SRB based traffic and can transfer these messages to the appropriate PDCP entity over the F1-C/F1*-C network interface.

In an embodiment, the IAB node 104 transfers and forwards the F1-C/F1*-C packets on the control plane over new DRB(s). The new DRB(s) can be configured in such a way that the traffic termination on F1-C/F1*-C packets on the DU 106*a* of the IAB donor 106 may be over the F1-C/F1*-C network interface to the CU 106*b* of the IAB donor 106. The new DRB may either be a single DRB for multiplexing both RRC-SRB1 and NAS-SRB2 messages on the same new DRB or may be 2 separate DRBs, one for carrying RRC-SRB1 and other for carrying NAS-SRB2 messages. The UE 102 and the DgNB 106 can initiate the transmission of the F1-C/F1*-C packets over the existing SRB1 and SRB2. Thus, the adapt layer at the IAB node 104 can perform a mapping of the F1-C/F1*-C packets on to the new DRB(s). The new DRB or the associated logical channel can have a node to node connectivity between the IAB node 104 and its parent node 104/106. The DU 104*a*/106*a* of the parent node 104*a*/106*a* identifies that the F1-C/F1*-C packets are received over the RLC or the new DRB or a logical channel that is configured to carry the SRB traffic (over the new DRB(s)). The DU 104*a*/106*a* of the parent node 104*a*/106*a* can instruct the adapt layer appropriately on the MT 104*b* of the IAB node 104 to map the F1-C/F1*-C packets to similar new DRB/logical channel/RLC entity for the next hop. Thus, at each hop, the F1-C/F1*-C packets are treated as SRB traffic and can be handled with priority during scheduling based on the MAC LCP and scheduling parameters which are tailored for SRB traffic. The CU 106*b* of the IAB Donor 106 can also be aware that the F1-C/F1*-C packets received on the new SRB or logical channel or RLC are for SRB based traffic and can transfer the F1-C/F1*-C packets received on the new DRB(s) to the appropriate PDCP entity over F1-C/F1*-C interface. The new DRB(s) need not be associated with any PDU session and are operational only hop to hop. The new DRB can start from one MT 104*a* of the IAB node 104 to another DU 104*b* of another IAB node 104 or vice versa.

In an embodiment, the IAB node 104 handles Radio Link Failure (RLF) in the phase 3. The IAB node 104 can trigger the RLF based on the cell selection performed by the MT 104*b* using the list of the IAB donor 106 and the assistance information received by the OAM server during the phase 1. When the MT 104*b* fails to perform the cell selection on any of the cells based on the assistance information received from OAM configuration, the MT 104*b* of the IAB node 104 can perform the cell selection on any available cell and can attempt to retrieve an updated OAM configuration to receive the updated assistance information. When the cell selection procedure fails or RLC recovery fails, the MT 104*b* can inform the upper layers about failure and can transition to 'out of service'. When the IAB node 104 detects or learns that the connected IAB node has encountered RLF, the IAB node 104 can send an indication to the parent node or the IAB donor 106 via the another IAB node indicating that the IAB node 104 has encountered the RLF. The IAB donor 106 can then provision an alternate routing path for routing of packets to the IAB nodes whose connectivity to the IAB donor 106 has been disrupted due to the RLF in the specific path. The IAB donor 106 can communicate the alternate routing path to the IAB nodes via a dedicated signaling or as user plane traffic or a Medium Access Control (MAC) Control Element (CE).

FIGS. 3*a* and 3*b* depict the 5G NSA network 100*b*, according to embodiments as disclosed herein. As illustrated in FIGS. 3*a* and 3*b*, the 5G NSA network 100*b* includes the UEs 102, the IAB nodes 104, the IAB donor(s) 106, the core network 201 and an eNodeB (eNB) 301. In the 5G NSA network 100*b*, the IAB nodes 104 and the IAB donor(s) 106 can be connected with the eNB 301. The eNB 301 can be an LTE Base Station (BS). Further, the eNB 301 and the IAB nodes 104 and the IAB donors 106 can be connected to the core network 201 that support the LTE functionality. Further, in the 5G NSA network 100*b*, the core network 201 can be an Evolved Packet Core (EPC) 201. The EPC 201 includes entities and network functions such as, but not limited to, a Mobility Management Entity (MME) (for managing control plane functionalities), a Serving Gateway (S-GW) (manages user plane functionalities) and a Packet Data Network Gateway (PGW) (acts as an interface between the UEs 102 and the external data network) and so on.

In the 5G NSA network 100*b*, the IAB donor 106 can be connected with the eNB 301. The CU 106*b* of the IAB donor 106 can be connected with the eNB 301 through an X2 interface. In an embodiment, in the 5G NSA network 100*b*, the IAB donor 106 can include a local gateway (L-GW) which is embedded with the CU 106*b* as illustrated in FIG. 3*b*.

In the 5G NSA network 100*b*, in order to provide the relaying functionalities to the connected UE(s) 102, the IAB node 104 performs the operations of the startup procedures in the three phases. In the phase 1, the IAB node 104 attaches to the 5G NSA network 100*b* via a legacy UE attach procedure to authenticate the IAB node 104 (acting as the UE) and to establish basic IP connectivity. When the IP connectivity is established, the OMA server associated with the EPC network 201 authenticates the IAB node 104 (as the UE) and downloads the pre-configurations to the IAB node 104. The IAB node 104 establishes necessary NG/F1 interfaces and goes into the normal operations. However, since the EPC network 201 does not have information of the TAB node 104, the EPC network 201 cannot provide the authentication and other pre-configurations to start the IAB node 104. In the 5G standalone network 100*a*, the IAB node 104 can set up the connection with the NGC 201 and perform the desired operations to start the IAB node, but this may not possible when the IAB node 104 or the IAB donor 106 working with the EPC core Network 201. Thus, in the 5G NSA network 100*b*, the IAB node 104 is required to attach with the EPC network 201 using at least one option described in the below embodiments.

In an embodiment, the IAB node 104 can be updated with the NAS functionality to connect with the EPC network as the UE. The MT 104*b* of the IAB node 104 can be updated with at least one of a minimal LTE functionality and a complete LTE functionality. Thus, in the NSA network 100*b*, the MT 104*b* of the IAB node can have both the LTE functionality and the NR functionality, but the DU 106*a* can have only the NR functionality (as illustrated in FIG. 3*c*). The LTE functionality can be used to perform at least one function such as, but not limited to, powering ON the attach procedure, transfer of control information, user plane information and any error occurred in the IAB node 104, re-configuration of the IAB node 104 and so on. The eNB 301 attached with the EPC network 201 can receive the information of the IAB donor 106 (the DgNB) and the routing information from the IAB donor 106 through the X2 interface and share the received information with the IAB node 104. The eNB 301 and the LTE part (the MT 104*b*) of the TAB node 104 can communicate with each other through an LTE Uu interface. Once the IAB is powered ON and configured with the resources, the NR may responsible for managing the user plane data and the control plane traffic.

In an embodiment, the IAB node 104 can connect with the EPC network 201 based on a Relaying Node (RN) attach procedure (as illustrated in FIG. 3*d*). When the IAB node 104 is powered ON, the IAB node 104 first attaches to the EPC network 201 (the LTE network) to obtain RN configurations. Alternatively, the IAB node 104 can be pre-configured with the information about the cells (the IAB donor 106) that can be accessed by the IAB node 104 and accordingly the TAB node 104 selects the cell and camps on the cell (the IAB donor 106). The IAB node 104 and the IAB donor 106 can then communicate with each other through the Uu air interface. When the IAB node 104 access the IAB donor 106 through the RN attach procedure (or any other procedures), the IAB donor 106 can authenticate the IAB node 104. During the RN attach procedure, the IAB donor 106 can share the routing information for the IAB node 104. The routing information can include the list of IAB donors 106 and information of different IAB nodes. The IAB node 104 can share the routing information received from the IAB donor 106 with the eNB 301 attached with the EPC network 201 over the X2/Xw/Xn interface.

In an embodiment, the IAB node 104 can perform an LTE RN procedure for power up and connecting with the EPC network 201. The LTE RN procedure includes a phase 1 and a phase 2 of operations as defined in 3GPP TS 36.300 and 36.806. In the phase 1, the IAB node 104 receives a RN pre-configuration and in the phase 2, the IAB node 104 attaches with the EPC core network 201 for the RN operation (attaches with the EPC core network as the relay node (the RN)). The EPC network 201 authenticates the IAB node 104 (the RN) and shares the routing information to the IAB node 104 to further access the IAB donor 106 and the routing information without a need of S1/X1 signaling.

Once the IAB node 104 connects to the EPC network 201, the IAB node 104 attaches to the eNB 301 as the UE over the LTE Uu interface and establishes a Packet Data Network (PDN) session (the PDU session) between the IAB node 104 and the core network 201 to download the pre-configurations required for the IAB node 104 to provide the relaying functionalities. The pre-configurations can include a list of relay supported eNBs/the gNB (the IAB nodes 104), an adapt layer configuration and so on.

In an embodiment, the pre-configurations can be stored in the non-volatile memory of the IAB node 104. Thus, the IAB node 104 may be powered IN by locally applying the pre-configurations.

In an embodiment, the IAB node 104 can receive the pre-configurations by performing an attach procedure. Once the IAB node 104 is connected with the EPC network 201 through the eNB 301, the IAB node 104 sends an attach request to the EPC network 301 for receiving the pre-configurations from the OAM server. On receiving the attach request, the MME of the EPC network 301 authenticates the IAB node 104 and sends an attach accept to the MT 104*b* of the IAB node 104. On receiving the attach accept, the MT 104*b* of the IAB node 104 initiates the PDN session establishment in order to connect with the OAM server. The requested PDN session can be between the MT 104*b* of the IAB node 104 and the OAM server connected through the LTE radio. Once the IAB node 104 is connected to the OAM server over the PDN session, the OAM server pushes the pre-configurations to the IAB node 104 (acting as the normal UE) over the PDN session based on the subscriptions of the IAB node 104.

When the IAB node 104 is acting as the UE in the phase 1, the IAB node 104 may perform an RRC control procedure. During the IAB node startup procedure, the IAB node 104 can receive minimum system information (SI) from the IAB donor 106 in a same manner as currently the UE is receiving. The minimum SI may include information to support cell selection. The minimum SI can also include information such as, but not limited to, other SIs available in the cell, a SIB type, validity information, information about whether the SI is broadcasted periodically or on demand and so on. If the minimum SI indicates that the SIB is not broadcasted, then the IAB node 104 (acting as the UE) does not assume that the SIB is a periodically broadcasted in its SI-Window at every SI-Period. The IAB node 104 (acting as the UE) may send an SI request to the IAB donor 106 to receive the SIB. The IAB node 104 (acting as the UE) receives other SIBs through an on-demand system procedure.

When the IAB node 104 acts as the UE, the MT 104*b* of the IAB node 104 receives the SI through at least one of broadcast and the on demand system information procedure. The MT 104 can follow the UE procedures to receive/read the SI from the IAB donor 106. When the IAB node acts a network node or the relay node, the DU 104*a* of the IAB node 104 may not require all types of the SI and resources and information required for the IAB node 104, since the DU 104*a* of the IAB node 104 may be different from the normal UE. Further, the IAB node 104 acting as the relay node can receive the SI in at least one of the dedicated RRC message, the scheduling information and so on. Alternatively, the IAB donor 106 may send the SI to the IAB node 104 through dedicated signaling intended for the LTE relay.

Once the IAB node 104 is authenticated as the UE and received the pre-configurations, the IAB node 104 needs to be authenticated by the EPC network 201 in order to function as the relay node. Thus, the IAB node 104 indicates its relaying capability to the entities and network functions of the EPC network 301 in at least one of the phase 1 and the phase 2 of the startup procedure.

In an embodiment, the IAB node 104 can indicate its relaying capability to the entities of the EPC network 301 as a part of the phase 1 operation. During the phase 1, the IAB node 104 (attached as the UE) indicates its relaying capability to the eNB 301 by sending a connection setup complete message to the eNB 301. The connection setup complete message includes a new IE. Based on the connection setup complete message, the eNB 301 can differentiate whether the IAB node 104 (attached as the UE) is the LTE relay node or the NR relay node.

In an embodiment, the IAB node 104 can indicate its relaying capability to the entities of the EPC network 301 as a part of the phase 2 operation. The IAB node 104 can send a connection setup message to the eNB 301 by including a RN indicator in the connection setup message. The eNB 301 can share the RN indicator and the IP address of the L-GW (placed at either the eNB 301 or the IAB donor 106) to the MME of the EPC network 301 during an initial UE context setup procedure (S1-AP setup procedure). Based on the RN indicator, the MME of the EPC network 201 can determine whether the IAB node 104 (attached as the UE) is the LTE relay node or the NR relay node.

In an embodiment, the eNB 104 may not send the RN indictor and the IP address of the L-GW to the MME of the EPC network 301. In such case, the MME may select the S-GW (of the EPC network 201) as part of any normal UE attach procedure and determine the relaying capability of the IAB node 104 (attached as the UE).

Once the IAB node 104 is authenticated as the relay node, the IAB node 104 may select and attach with the IAB donor 106 (over the singe hop and the multiple hop) using the pre-configurations received from the OAM server for serving the connected UE 102.

In an embodiment, the IAB node 104 can be pre-configured with the information of the IAB donor 106 and the routing information. When the IAB node 104 operates as a standalone node with the MT 104*b* and the DU 104*a* (the gNB) functionality, the IAB node 104 can be pre-configured with the information about which cells (the IAB donor 106/DgNBs) that the IAB node 104 can access. Accordingly, the IAB node 104 can select a cell and camp on the cell, using the pre-configured information. Further, the IAB node 104 may be pre-configured with authentication information. The IAB donor 106 can use the pre-configured authentication information to authenticate the IAB node 104 as the relay node. In order to authenticate the IAB node 104 using the pre-configured authentication information, the IAB donor may require additional authentication functionality. For example, if the IAB node 104 requires the PDU session, then the IAB donor 106 can be updated with some part of the UPF and AMF functionality.

In an embodiment, the IAB donor 106 can receive the routing information from the IAB node 104 that is updated with minimal NGC functionality. The IAB donor 106 can use the updated minimal NGC functionality for authentication of the IAB node 104, setting up of the PDU session and sharing the routing information with the IAB node 104.

In an embodiment, the IAB node 104 may follow an EN-DC procedure to receive the information of the IAB donor 106 and the routing information. Once the IAB node 104 is powered ON, the eNB 301 can inform the IAB donor 106 about an existence of the IAB node 104 over the X2 interface by sharing a measurement report with the IAB donor 106. On receiving the measurement report, the IAB donor 106 can trigger a Secondary Node (SN) cell addition procedure for the IAB node 104 and share the routing information and the information of the IAB donor 106 with the IAB node 104. The measurement report can include information about such as, but not limited to, Reference Signal Received Power (RSRP), Reference Signal Received Quality (RSRQ), Signal to Noise Ratio (SNR), Physical Cell Identity (PCI), beam identifier (beam Id) and so on. The routing information can indicate the IAB node 104 about the node through which the IAB node 104 needs to connect and perform a random-access channel (RACH) procedure. The information of the IAB donor 106 can be at least one of an ID of the IAB node 104, a cell ID, a frequency along with other list of cells that require routing and so on. Further, the IAB donor 106 can update the routing information in its system information. The information of the IAB donor 106 can be shared with the IAB node 104 through at least one of a LTR RRC message, NR RRC message, a new message introduced for the IAB node 104 (indicating IAB routing information or IAB RRC reconfiguration). On receiving the routing information and the information of the IAB donor 106 from the IAB donor 106, the IAB node 104 can set up a path with at least one of the multiple IAB nodes 104 and the IAB donor 106.

In an embodiment (IAB node discovery and selection), once the IAB node 104 (acting as the UE) attaches to the EPC network/LTE network, the IAB node 104 may work in the EN-DC mode of operation due to high data rate. The eNB 301 can receive a NR measurement report (MRM) from the IAB node 104 (acting as the UE). The MRM includes measurements of the NR, that includes the IAB node cell, the IAB donor cell and other IAB nodes. The eNB 301 shares the MRM report with the specific IAB donor 106 of the connected one or more IAB donors 106. The IAB donor 106 identifies that whether the IAB node 104 (acting as the UE) is in the vicinity of the specific IAB node or directly in the vicinity of the IAB donor 106 itself based on the cells provided in the MRM. If the IAB node 104 (acting as the UE) is in the direct vicinity/coverage of the IAB donor 106, then the IAB node 104 needs to follow procedures as defined in the current NR specification.

If the IAB node 104 is in the vicinity of the specific IAB node, then the IAB node 104 can perform a Secondary Node (SN) addition procedure with the cell of the specific other IAB node. The IAB node 104 can perform the SN addition procedure only if a path is set between the IAB donor 106 and the specific other IAB node 104. If the path is not setup between the IAB donor 106 and the specific IAB node 104 while performing the SN addition procedure, the IAB node 104 can share the routing information with the other IAB node 104 while performing the RACH procedure with the other IAB node 104. The IAB node 104 can also perform the RACH procedure with the IAB donor 106 or the other IAB node 104 to setup the connection based on the routing information stored in the IAB node 104.

Alternatively, the IAB donor 106 can send a paging message over the network 100b, so that the IAB node 104 can setup the connection with the IAB donor 106. The IAB donor 106 can send the paging message to the other IAB nodes 104 present in the route based on the routing information stored at the IAB donor 106 and setup the F1 interface between the IAB node 104 and the IAB donor 106. The IAB donor 106 can then share the same cell (the IAB node 104) with the eNB 301 to perform the SN cell addition procedure. The IAB node 104 can be attached to the EPC network 201, on the completion of the SN cell addition procedure.

Further, in an embodiment, the IAB node 104 can perform the RRC connection establishment procedure to set up the connection with the selected IAB donor 106 during at least one of the RN startup procedure, attach/detach or bearer establishment for the data bearer and so on. When the IAB node 104 starts operating as the relay node, the IAB donor 106 can distinguish an access UE type, regular UE or IAB node, as the DgNB can provide IAB node specific configurations (an adaptation layer or a sub frame related configuration and so on) that are not required for the normal UE. Thus, the IAB node 104 acting as the relay node can provide an explicit indicator to the IAB donor 106 during the RRC connection establishment procedure in order to distinguish between the normal UE and the IAB node 104. In an embodiment, the IAB node 104 can send the explicit indicator to the IAB donor 106 during the RRC connection establishment procedure indicating that the connection is established for the IAB node 104.

Once the IAB node 104 is authenticated as the relay node and attaches with the IAB donor 106 (through the single hop or the multiple hop), the IAB node 104 can initiate activation of the DU 104a and setting up of the F1/F1* network interface with the CU 106b of the IAB donor 106. The IAB node 104 can follow the same procedures as described above with respect to the 5G standalone network for setting up the F1/F1* network interface.

After setting up the F1/F1* network interface, in the phase 3, the IAB node 104 can provide the IP connectivity to the connected UE 102 for the external network.

Once the PDU session is established, the IAB node 104 can forward the user plane traffic and the control plane traffic of the at least one the connected UE 102 and the other IAB node 104 to the IAB donor 106 (over the single hop or the multiple hop) by mapping the user plane traffic and the control plane traffic on to the radio bearer or the logic channel. Thus, in the phase 3, the adapt layer of the IAB node 104 can be configured by the OAM server with the mapping rules.

In an embodiment, the adapt layer can be configured to provide mapping of traffic generated by at least one of the IAB node 104 and the UE 102 onto the NR Uu. The adapt layer can reside above RLC or above MAC or above PHY.

In an embodiment, the adapt layer can be configured by the OAM server with the configurations that need to be configured in all the IAB node working to make the relay path and to maintain the QoS across all the IAB nodes 104.

In an embodiment, the OAM server can configure the adapt layer with DRB mapping information in an RRCConnectionReconfiguration on the SRB1 for a particular radio bearer. Even in case the IAB node 104 is a gNB, the adapt header may not undergo PDCP security procedures in order to make the adapt header accessible to each IAB node 104 in the relay path.

In an embodiment, the OAM server can configure the adapt layer with DRB mapping information in at least one of an existing LTE RN configuration message and a new IAB configuration message on at least one of a new SRB/DRB and mapped to existing SRBs/DRBs. The OAM server can provide the same adapt layer with DRB mapping information of all the IAB nodes present in the relay path. Further, the adapt layer header may not undergo the PDCP security procedures in order to make the adapt header accessible to each IAB node in the relay path.

In the phase 3, the IAB node 104 may forward the user plane traffic and the control plane traffic of the at least one the connected UE 102 and the other IAB node 104 to the IAB donor 106 (through the single hop or the multiple hop) as the F1/F1* messages over the F1/F1* network interface. For initiating the forwarding of the F1/F1* messages, the IAB node 104 can initiate a F1* setup over the Uu radio bearer as configured.

In an embodiment, the adapt layer of the IAB node 104 can map the specific F1/F1* network interface related messages (hereinafter referred as F1/F1* messages or F1*/X2/S1 messages) on to at least one of an existing SRB/DRB and a new SRB/DRB by creating a mapping rule. In the IAB nodes 104 of the EN-DC network 100b, the bearer can always be a Secondary Cell Group (SCG) bearer and the F1*/X2/S1 messages can terminate at the neighboring IAB node 104 or the IAB donor 106.

In an embodiment, the IAB node 104 can use a new RRC message to carry the F1*/X2/S1 messages. The RRC message may terminate at the CU 106b of the IAB donor 106. The CU 106b of the IAB donor 106 can process the RRC message and send a RRC response to the IAB node 104.

In an embodiment, the IAB node 104 can use an encapsulated dedicated NAS message to carry the F1*/X2/S1 messages. The dedicated NAS message can terminate at local MME of the IAB donor 106. The local MME of the IAB donor 106 may forward the NAS message to the CU 106b of the IAB donor 106. The CU 106b of the IAB donor 106 can complete the F1* setup procedure and send a response in the NAS dedicated message.

Embodiments herein further provide priority to the F1*/X2/S1 messages that are having a longer hop in order to reduce the latency in the relay path. Thus, at each hop, the adapt layer may be aware of number of hops a particular message has undergone to reach the IAB node 104. Thus, the adapt header can have a hop count which can be incremented or decremented with each hop.

In an embodiment, the at least one of the IAB donor 106 and the eNB 301 can maintain a relay routing table/database. The relay routing table includes information about configured relay routes/paths. The relay routes can be statically configured. Alternatively, the at least one of the IAB donor 106 and the eNB 301 can update the relay routes based on attachment of a new IAB node and detachment of the IAB node as the relay node. The at least one of the IAB donor 106 and the eNB 301 can provide access to at least one of all the IAB nodes 104 that are relay capable and the IAB donors 106 for the route selection. The relay routing table can further include the hop information like accessible IAB nodes and a number of hops required to reach the IAB node.

Further, in the phase 3, the IAB donor 106 can keep track of the status of the relay path in the relay routing table. In an embodiment, the IAB donor 106 may update the relay path in the relay routing table on detecting a failure causing the relay route to become not operational. The MT 104b of the IAB node 104 can send the measurement reports to at least one of the serving IAB node, the neighbor probable IAB cells, the eNB 301 and the IAB donor 106. On receiving the measurement reports from the IAB node 104, the IAB donor 106 (or the eNB 301) can initiate the SN change procedure to replace the bad IAB node with the better neighbor IAB node in the relay path. The IAB node 104 can also send load information (load of the cell) to the IAB donor 106 (or the eNB). The IAB donor 106 (the eNB) can use the load information to replace the loaded IAB node with other suitable IAB node 104. The IAB donor 106 may further reflect the route update in the relay routing table.

In an embodiment, the IAB node 104 can provide information to at least one of the IAB donor 106 and the eNB 301 about the RLF which is causing the relay path to break. The RLF can cause the relay path to break due to conditions such as, but not limited to, RLC retransmission failure, RRC Reconfiguration failure, RACH failures, RLF, and so on. The occurrence of these conditions can cause the MT 104b of the affected IAB node 104 to trigger an RLF recovery procedure. The IAB node 104 can send a report to the at least one of the IAB donor 106 and the eNB 301 when the relay path breaks. The report includes information such as, but not limited to, a unique ID of the IAB node 104, cell information, the conditions/causes, measurements and so on. The IAB node 104 can send the report using at least one of a present SCG failure RRC message and a new RRC message. On receiving the RLF indication from the report of the IAB node 104, the at least one of the IAB donor 106 and the eNB 301 may configure measurement objects (such as RSRQ, RSRP, SNR, PCI, beam Id and so on) on the reporting MT 104b of the IAB node 104. If the relay path recovery procedure is ongoing, then the at least one of the IAB donor 106 and the eNB 301 may request all the UEs 102 to release SCG configuration and SCG bearers that can be converted as a master cell group (MCG) bearer. Once the relay path recovery procedure is completed (the relay route is recovered), the at least one of the IAB donor 106 and the eNB 301 can reconfigure the SCG bearers for the UEs 102.

FIG. 4 is a flow diagram 400 illustrating a method for managing the operations of the IAB node 104 in the communication network 100, according to embodiments as disclosed herein.

At step 402, the method includes, attaching, by the IAB node 104, as the UE to the communication network 100 (the 5G communication network) for at least one of the pre-configurations and the assistance information. The network nodes can authenticate as the IAB node 104 (acting as the UE) as the valid node based on the subscription data. After the successful authentication, the IAB node 104 can receive at least one of the pre-configurations and the assistance information from the OAM server associated with the core network 201.

At step 404, the method includes, attaching, by the IAB node 104, as the IAB relaying node to at least one of the IAB donor 106 and the active IAB node 104 having connectivity with the IAB donor 106 by performing at least one operation using the at least one of the received pre-configurations and the assistance information. The operation includes indicating the relaying capability to the network node to be authenticated as the rely node, selecting and attaching to the at least one of the IAB donor 106 and the active IAB node 104 having connectivity with the IAB donor 106 as the IAB relaying node, setting up the RAN part and the direct F1* network interface with the IAB donor 104. The F1* network interface includes a F1*-U network interface and a F1*-C interface.

At step 406, the method includes providing, by the IAB node 104, the IP connectivity to the connected UE 102 towards the external data network. Thus, serving the UEs with better QoS and coverage.

The various actions, acts, blocks, steps, or the like in the method and the flow diagram 400 may be performed in the order presented, in a different order or simultaneously. Further, in some embodiments, some of the actions, acts, blocks, steps, or the like may be omitted, added, modified, skipped, or the like without departing from the scope of the invention.

The embodiments disclosed herein can be implemented through at least one software program running on at least one hardware device and performing network management functions to control the elements. The elements shown in FIG. 1a-FIG. 4 can be at least one of a hardware device, or a combination of hardware device and software module.

FIG. 5 is a flow diagram illustrating a method for performing a communication of the TAB node in a wireless communication system, according to embodiments as disclosed herein.

M operation S510, the IAB node performs an authentication and a setup of an IP connectivity with an OAM (operations, administration and maintenance) server.

In operation S520, the IAB node establishes a F1 interface between a DU of the IAB node and a CU of an IAB donor, in response to an architecture in which a DU (distribution unit) and a CU (central unit) are split.

In operation S530, the IAB node provides a service to a UE based on a result of the establishment.

FIG. 6 is a diagram illustrating an IAB node according to embodiments as disclosed herein.

Referring to the FIG. 6, the IAB node 600 may include a processor 610, a transceiver 620 and a memory 630. However, all of the illustrated components are not essential. The IAB node 600 may be implemented by more or less components than those illustrated in FIG. 6. In addition, the processor 610 and the transceiver 620 and the memory 630 may be implemented as a single chip according to another embodiment.

The aforementioned components will now be described in detail.

The processor 610 may include one or more processors or other processing devices that control the proposed function, process, and/or method. Operation of the IAB node 600 may be implemented by the processor 610.

The processor 610 may perform an authentication and a setup of an IP connectivity with an OAM (operations, administration and maintenance) server. In response to an architecture in which a DU (distribution unit) and a CU (central unit) are split, The processor 610 may establish a F1 interface between a DU of the IAB node and a CU of an IAB donor. The processor 610 may provide a service to a UE based on a result of the establishment.

The transceiver 620 may include a RF transmitter for up-converting and amplifying a transmitted signal, and a RF receiver for down-converting a frequency of a received signal. However, according to another embodiment, the transceiver 620 may be implemented by more or less components than those illustrated in components.

The transceiver 620 may be connected to the processor 610 and transmit and/or receive a signal. The signal may include control information and data. In addition, the transceiver 620 may receive the signal through a wireless channel and output the signal to the processor 610. The transceiver 620 may transmit a signal output from the processor 610 through the wireless channel.

The memory 630 may store the control information or the data included in a signal obtained by the IAB node 600. The memory 630 may be connected to the processor 610 and store at least one instruction or a protocol or a parameter for the proposed function, process, and/or method. The memory 630 may include read-only memory (ROM) and/or random access memory (RAM) and/or hard disk and/or CD-ROM and/or DVD and/or other storage devices.

The embodiments disclosed herein describe methods and systems for managing operations of Integrated Access Backhaul (IAB) nodes in a communication network. Therefore, it is understood that the scope of the protection is extended to such a program and in addition to a computer readable means having a message therein, such computer readable storage means contain program code means for implementation of one or more steps of the method, when the program runs on a server or mobile device or any suitable programmable device. The method is implemented in a preferred embodiment through or together with a software program written in e.g. Very high speed integrated circuit Hardware Description Language (VHDL) another programming language, or implemented by one or more VHDL or several software modules being executed on at least one hardware device. The hardware device can be any kind of portable device that can be programmed. The device may also include means which could be e.g. hardware means like e.g. an ASIC, or a combination of hardware and software means, e.g. an ASIC and an FPGA, or at least one microprocessor and at least one memory with software modules located therein. The method embodiments described herein could be implemented partly in hardware and partly in software. Alternatively, the invention may be implemented on different hardware devices, e.g. using a plurality of CPUs.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of embodiments, those skilled in the art will recognize that the embodiments herein can be practiced with modification within the spirit and scope of the embodiments as described herein.

The invention claimed is:

1. An integrated access and backhaul (IAB) node for performing a communication, the TAB node comprising:
   a transceiver; and
   a processor coupled with the transceiver and configured to:
   transmit, to an IAB donor, a radio resource control (RRC) setup complete message including an TAB node indication indicating connecting as the TAB node, wherein the IAB donor comprises a distribution unit (DU) of the IAB donor and a central unit (CU) of the IAB donor,
   establish an F1 interface between a DU of the TAB node and the CU of the IAB donor, after the TAB node is authenticated with a core network entity based on the TAB node indication,
   provide a service to a user equipment (UE) connected to the TAB node based on a result of the F1 interface establishment,
   determine a radio link failure (RLF) of the TAB node and send an indication to the IAB donor via another TAB node indicating that the TAB node has encountered the RLF, and
   receive, from the IAB donor, a dedicated signaling including information related to an alternate route path, based on the RLF of the TAB node.

2. The IAB node of claim 1, wherein the processor is configured to perform a setup of an internet protocol (IP) connectivity with an operations, administration and maintenance (OAM) server, and control the transceiver to receive information regarding an OAM configuration from the OAM server via the IP connectivity.

3. The IAB node of claim 1, wherein the processor is further configured to:
   control the transceiver to receive information including at least one of information of the IAB donor, IAB nodes, or hop count, and
   select a parent node among a plurality of next hop nodes for a data transmission according to the information, and wherein the IAB node is selected as the parent node by a previous hop node in case that multiple intermediate IAB nodes are between the IAB donor and the UE.

4. The IAB node of claim 1, wherein the processor is further configured to:
  establish a protocol data unit (PDU) session between a mobile termination (MT) of the IAB node and an operations, administration and maintenance (OAM) server.

5. The IAB node of claim 1, wherein the processor is further configured to:
  receive information transmitted from the IAB donor, wherein the information is transmitted to the IAB node on an adaptation layer, and includes identification information specifying a user equipment (UE) bearer and quality of service (QoS) information.

6. The IAB node of claim 1, wherein a signaling between a mobile termination (MT) on the IAB node and a central unit control plane (CU-CP) of an IAB-donor using RRC protocol is carried over a signaling radio bearer (SRB).

7. A method performed by an integrated access and backhaul (IAB) node, the method comprising:
  transmitting, to an IAB donor, a radio resource control (RRC) setup complete message including an TAB node indication indicating connecting as the TAB node, wherein the IAB donor comprises a distribution unit (DU) and a central unit (CU);
  establishing an F1 interface between the DU of the TAB node and the CU of the IAB donor, after the TAB node is authenticated with a core network entity based on the TAB node indication;
  providing a service to a user equipment (UE) connected to the JAB node based on a result of the F1 interface establishment,
  determining a radio link failure (RLF) of the IAB node and send an indication to the IAB donor via another IAB node indicating that the IAB node has encountered the RLF, and
  receiving, from the IAB donor, a dedicated signaling including information related to an alternate route path, based on the RLF of the IAB node.

8. The method of claim 7, further comprising:
  performing a setup of an internet protocol (IP) connectivity with an operations, administration and maintenance (OAM) server; and
  receiving information regarding an OAM configuration from the OAM server via the IP connectivity.

9. The method of claim 7, further comprising:
  receiving information including at least one of information of the IAB donor, IAB nodes, or hop count; and
  selecting a parent node among a plurality of next hop nodes for a data transmission according to the information, wherein the IAB node is selected as the parent node by a previous hop node in case that multiple intermediate IAB nodes are between the IAB donor and the UE.

10. The method of claim 7, further comprising:
  establishing a protocol data unit (PDU) session between a mobile termination (MT) of the IAB node and a OAM server.

11. The method of claim 7, further comprising:
  receiving information transmitted from the IAB donor, wherein the information is transmitted on an adaptation layer, and includes identification information specifying a user equipment (UE) bearer and quality of service (QoS) information.

12. The method of claim 7, wherein a signaling between a mobile termination (MT) on the IAB node and a control unit control plane (CU-CP) of an IAB-donor using radio resource control (RRC) protocol is carried over a signaling radio bearer (SRB).

13. A non-transitory computer-readable recording medium that stores a program that, when executed by a processor, causes an integrated access and backhaul (IAB) node of a communication network to:
  transmit, to an IAB donor, a radio resource control (RRC) setup complete message including an JAB node indication indicating connecting as the IAB node, wherein the IAB donor comprises a distribution unit (DU) and a central unit (CU),
  establish an F1 interface between the DU of an integrated access and backhaul (IAB) node and the CU of the IAB donor, after the IAB node is authenticated with a core network entity based on the IAB node indication,
  provide a service to a user equipment (UE) connected to the IAB node based on a result of the F1 interface establishment,
  determine a radio link failure (RLF) of the IAB node and send an indication to the IAB donor via another IAB node indicating that the IAB node has encountered the RLF, and
  receive, from the IAB donor, a dedicated signaling including information related to an alternate route path, based on the RLF of the IAB node.

14. The IAB node of claim 1, wherein the processor is configured to control the transceiver to receive, from at least one node including at least one of the IAB donor, or other IAB node, a system information block (SIB) message, and select a parent node among at least one node based on the SIB message.

15. The method of claim 7, further comprising:
  receiving, from at least one node including at least one of the IAB donor, or other IAB node, a system information block (SIB) message; and
  selecting a parent node among at least one node based on the SIB message.

* * * * *